US011897499B2

United States Patent
Mimura et al.

(10) Patent No.: US 11,897,499 B2
(45) Date of Patent: Feb. 13, 2024

(54) AUTONOMOUS DRIVING VEHICLE INFORMATION PRESENTATION DEVICE

(71) Applicant: HONDA MOTOR CO., LTD., Tokyo (JP)

(72) Inventors: Yoshitaka Mimura, Saitama (JP); Yuki Kizumi, Saitama (JP); Takashi Oshima, Saitama (JP); Yuji Tsuchiya, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 157 days.

(21) Appl. No.: 17/411,513

(22) Filed: Aug. 25, 2021

(65) Prior Publication Data
US 2022/0063675 A1 Mar. 3, 2022

(30) Foreign Application Priority Data

Aug. 27, 2020 (JP) .................. 2020-143967

(51) Int. Cl.
*B60W 60/00* (2020.01)
*B60W 10/04* (2006.01)
(Continued)

(52) U.S. Cl.
CPC .......... *B60W 60/001* (2020.02); *B60Q 1/507* (2022.05); *B60Q 1/5035* (2022.05);
(Continued)

(58) Field of Classification Search
CPC .. B60W 60/0027; B60W 10/04; B60W 10/20; B60W 2554/4041;
(Continued)

(56) References Cited

U.S. PATENT DOCUMENTS

| 2005/0015203 A1* | 1/2005 | Nishira | B60W 50/16 340/436 |
| 2009/0192710 A1* | 7/2009 | Eidehall | B60W 50/0097 701/300 |

(Continued)

FOREIGN PATENT DOCUMENTS

| JP | H03-235200 A | 10/1991 |
| JP | 2013-036932 A | 2/2013 |

(Continued)

OTHER PUBLICATIONS

May 10, 2022, Japanese Office Action issued for related JP Application No. 2020-143967.

*Primary Examiner* — Jonathan M Dager
*Assistant Examiner* — Jean W Charleston
(74) *Attorney, Agent, or Firm* — Paratus Law Group, PLLC

(57) ABSTRACT

An autonomous driving vehicle information presentation device includes a traffic congestion information acquisition unit that acquires information on traffic congestion ahead in a traveling direction of an own vehicle, a traveling lane identification unit that identifies a lane where the own vehicle is currently located, a stop position prediction unit that acquires a traveling state of a preceding vehicle based on an external environment information and the traffic congestion information, and to predict a stop position related to the preceding vehicle based on the acquired traveling state, an action plan generation unit that generates an action plan of the own vehicle based on the stop position and the currently located lane, and an information presentation unit that presents information including the generated action plan through using an external display device provided at a rear portion of a vehicle interior of the own vehicle.

2 Claims, 14 Drawing Sheets

(51) Int. Cl.
*B60W 10/20* (2006.01)
*G08G 1/0967* (2006.01)
*B60Q 1/50* (2006.01)

(52) U.S. Cl.
CPC .......... *B60Q 1/5037* (2022.05); *B60Q 1/543* (2022.05); *B60Q 1/545* (2022.05); *B60Q 1/547* (2022.05); *B60W 10/04* (2013.01); *B60W 10/20* (2013.01); *B60W 60/0027* (2020.02); *G08G 1/096791* (2013.01); *B60W 2554/406* (2020.02); *B60W 2554/4041* (2020.02); *B60W 2555/60* (2020.02); *B60W 2710/20* (2013.01); *B60W 2720/10* (2013.01)

(58) Field of Classification Search
CPC ....... B60W 2554/406; B60W 2555/60; B60W 2710/20; B60W 2720/10; B60W 60/001; B60W 50/14; B60Q 1/50; B60Q 1/5037; B60Q 1/507; G08G 1/096791; G08G 1/096716; G08G 1/09675; G08G 1/096775; G06V 10/25; G06V 20/58; B60K 35/00
USPC .......................................................... 701/25
See application file for complete search history.

(56) References Cited

U.S. PATENT DOCUMENTS

| | | | |
|---|---|---|---|
| 2013/0041573 A1* | 2/2013 | Ochi | G08G 1/08 701/117 |
| 2016/0229402 A1* | 8/2016 | Morita | G08G 1/163 |
| 2016/0304097 A1* | 10/2016 | Taira | B60W 10/20 |
| 2017/0113664 A1* | 4/2017 | Nix | G08B 13/19669 |
| 2018/0151066 A1* | 5/2018 | Oba | G05D 1/0223 |
| 2019/0031105 A1* | 1/2019 | Kim | B60R 1/081 |
| 2019/0031190 A1* | 1/2019 | Choi | B60W 10/10 |
| 2019/0195651 A1* | 6/2019 | Amano | G01C 21/3676 |
| 2019/0291730 A1* | 9/2019 | Kamiya | G06V 20/58 |
| 2020/0047749 A1* | 2/2020 | Morotomi | B60W 30/09 |
| 2020/0055517 A1* | 2/2020 | Kim | B60W 30/0956 |
| 2020/0102010 A1* | 4/2020 | Kim | B60W 50/08 |
| 2022/0009524 A1* | 1/2022 | Oba | B60W 60/0061 |
| 2022/0144261 A1* | 5/2022 | Fang | B60W 30/18154 |
| 2022/0146840 A1* | 5/2022 | Ota | B60K 35/00 |

FOREIGN PATENT DOCUMENTS

| | | | |
|---|---|---|---|
| JP | 2017-004471 A | | 1/2017 |
| JP | 2017004471 A | * | 1/2017 |
| JP | 2017-199317 A | | 11/2017 |
| WO | WO 2015/087395 A1 | | 6/2015 |

* cited by examiner

AUTONOMOUS DRIVING VEHICLE INFORMATION PRESENTATION DEVICE

CROSS-REFERENCE TO RELATED APPLICATION

The present application claims priority from Japanese Patent Application No. 2020-143967 filed on Aug. 27, 2020, the entire content of which is incorporated herein by reference.

BACKGROUND

Technical Field

The present invention relates to an autonomous driving vehicle information presentation device that is used in an autonomous driving vehicle and presents information to a person existing around an own vehicle.

Description of the Related Art

In recent years, in order to achieve safe and comfortable operation of a vehicle while reducing a burden on a driver, a technique called autonomous driving has been eagerly proposed.

As an example of the autonomous driving technique, JP-A-2017-199317 discloses a vehicle control system including: a detection unit that detects a surrounding state of a vehicle; an autonomous driving control unit that execute autonomous driving in which at least one of speed control and steering control of the vehicle is automatically performed based on the surrounding state of the vehicle detected by the detection unit; a recognition unit that recognizes a direction of a person relative to the vehicle based on the surrounding state of the vehicle detected by the detection unit; and an output unit that outputs information recognizable by the person recognized by the recognition unit, the information having directivity in the direction of the person recognized by the recognition unit.

JP-A-H3-235200 discloses an invention of a following vehicle traffic signal display device that displays a traffic signal display state of a traffic light existing ahead of a own vehicle to a following vehicle following the own vehicle.

However, in the related art, there is room for improvement from the viewpoint of presenting (notifying) appropriate information to a traffic participant existing around an own vehicle of an autonomous driving vehicle.

SUMMARY

The present invention provides an autonomous driving vehicle information presentation device capable of presenting appropriate information to a traffic participant existing around an own vehicle of an autonomous driving vehicle in consideration of a lane where the own vehicle is currently located.

According to an aspect of the present invention, there is provided an autonomous driving vehicle information presentation device used for an autonomous driving vehicle that acquires external environment information including a preceding vehicle existing ahead in a traveling direction of an own vehicle and automatically performs at least one of speed control and steering control of the own vehicle based on the acquired external environment information, the autonomous driving vehicle information presentation device being configured to present information to a traffic participant existing around the own vehicle, the autonomous driving vehicle information presentation device. The autonomous driving vehicle information presentation device includes: a traffic congestion information acquisition unit configured to acquire information on traffic congestion ahead in the traveling direction of the own vehicle; a traveling lane identification unit configured to identify a lane where the own vehicle is currently located; a stop position prediction unit configured to acquire a traveling state including deceleration, slow traveling, and stop of the preceding vehicle based on the external environment information and the traffic congestion information, and to predict a stop position related to the preceding vehicle based on the acquired traveling state of the preceding vehicle; an action plan generation unit configured to generate an action plan of the own vehicle based on the stop position related to the preceding vehicle and the currently located lane; and an information presentation unit configured to present information including the generated action plan through using an external display device provided at a rear portion of a vehicle interior of the own vehicle at a position visible to an occupant of a following vehicle, According to the present invention, the autonomous driving vehicle information presentation device capable of presenting the appropriate information to the traffic participant existing around the own vehicle of the autonomous driving vehicle in consideration of the lane where the own vehicle is currently located can be provided.

DESCRIPTION OF EMBODIMENTS

Figure 1:
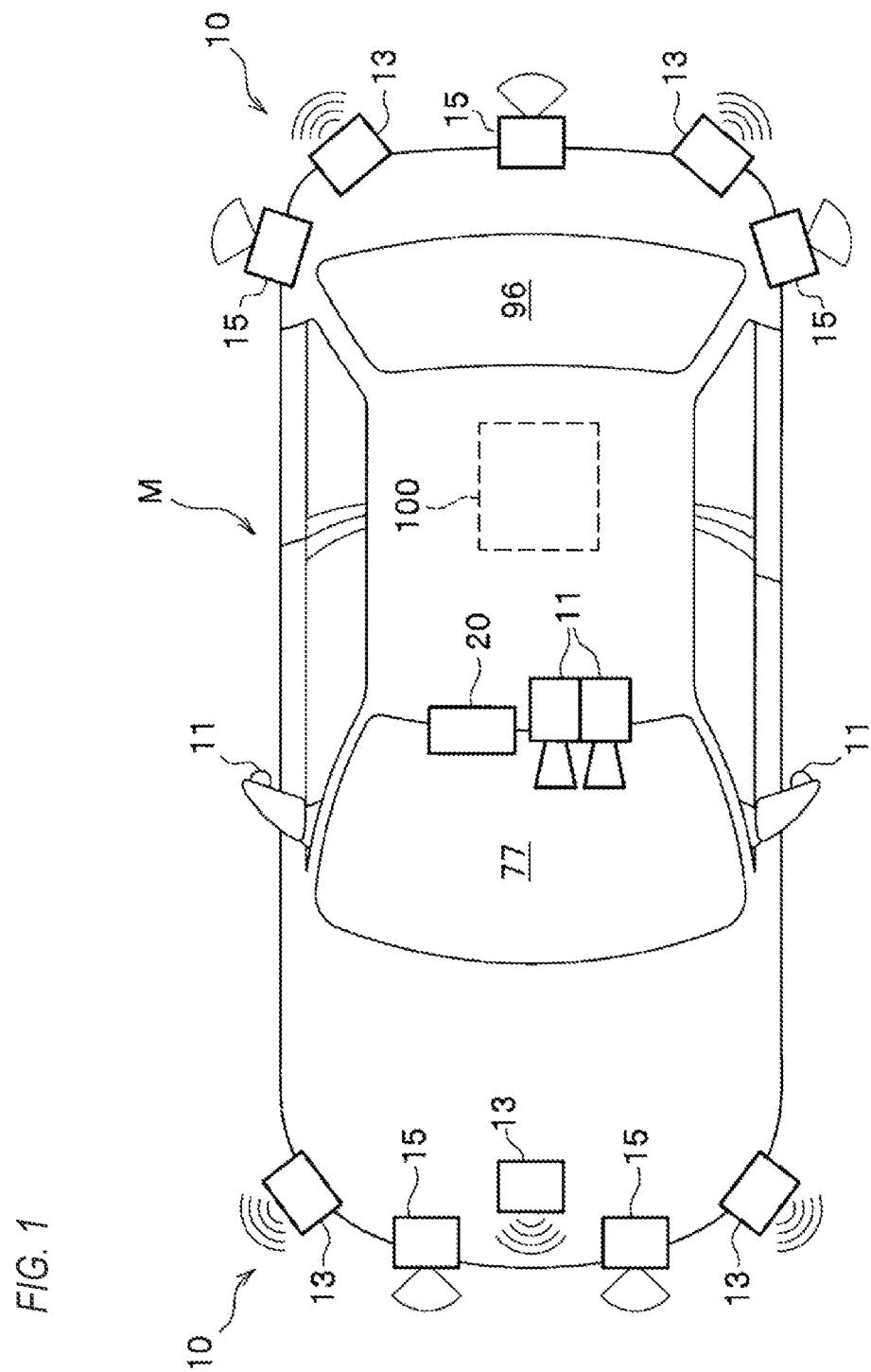
FIG. 1 is an overall configuration diagram of an autonomous driving vehicle including an information presentation device according to an embodiment of the present invention.

Hereinafter, an autonomous driving vehicle information presentation device according to an embodiment of the present invention will be described in detail with reference to the drawings.

Note that, in the drawings described below, members having common functions are denoted by common reference signs. In addition, the size and shape of the member may be schematically shown in a deformed or exaggerated manner for convenience of description.

In description of a vehicle control device according to the embodiment of the present disclosure, when expressions of left and right are used for an own vehicle M, orientation of a vehicle body of the own vehicle M is used as a reference. Specifically, for example, in a case where the own vehicle M has a right hand drive specification, a driver seat side is referred to as a right side, and a passenger seat side is referred to as a left side.

[Configuration of Own Vehicle M]

First, a configuration of an autonomous driving vehicle (hereinafter, also referred to as an "own vehicle") M including a vehicle control device 100 according to the embodiment of the present invention will be described with reference to FIG. 1.

FIG. 1 is an overall configuration diagram of the autonomous driving vehicle M including the vehicle control device 100 according to the embodiment of the present invention.

In FIG. 1, the own vehicle M on which the vehicle control device 100 is mounted is, for example, an automobile such as a two-wheeled automobile, a three-wheeled automobile, or a four-wheeled automobile.

Examples of the own vehicle M include an automobile having an internal combustion engine such as a diesel engine or a gasoline engine as a power source, an electric automobile having an electric motor as a power source, and a hybrid automobile having both an internal combustion engine and an electric motor. Among these automobiles, the electric automobile is driven by using electric power discharged from a battery such as a secondary battery, a hydrogen fuel battery, a metal fuel battery, or an alcohol fuel battery.

As shown in FIG. 1, the own vehicle M is equipped with an external environment sensor 10 that has a function of detecting external environment information on a target including an object or a sign existing around the own vehicle M, a navigation device 20 that has a function of mapping a current position of the own vehicle M on a map and performing route guidance to a destination and the like, and the vehicle control device 100 that has a function of performing autonomous travel control of the own vehicle M including steering, acceleration and deceleration of the own vehicle M, and the like.

These devices and instruments are connected to each other via a communication medium such as a controller area network (CAN) so as to be capable of performing data communication with each other.

In the present embodiment, a configuration in which the external environment sensor 10 and the like are provided outside the vehicle control device 100 is described as an example, and alternatively the vehicle control device 100 may be configured to include the external environment sensor 10 and the like.

[External Environment Sensor 10]

The external environment sensor 10 includes a camera 11, radar 13, and a LIDAR 15.

The camera 11 has an optical axis inclined obliquely downward in front of the own vehicle and has a function of imaging an image in a traveling direction of the own vehicle M. As the camera 11, for example, a complementary metal oxide semiconductor (CMOS) camera, a charge-coupled device (CCD) camera, or the like can be appropriately used. The camera 11 is, for example, provided in the vicinity of a rearview mirror (not shown) in a vehicle interior of the own vehicle M, and in a front portion of a right door and a front portion of a left door outside the vehicle interior of the own vehicle M.

For example, the camera 11 periodically and repeatedly images a state of a front side, a right rear side, and a left rear side in the traveling direction of the own vehicle M. In the present embodiment, the camera 11 provided in the vicinity of the rearview mirror is configured with a pair of monocular cameras arranged side by side. The camera 11 may also be a stereo camera.

Image information on the front side, the right rear side, and the left rear side in the traveling direction of the own vehicle M acquired by the camera 11 is transmitted to the vehicle control device 100 via a communication medium.

The radar 13 has a function of emitting a radar wave to a target including a preceding vehicle, which travels in front of the own vehicle M and is a follow-up target thereof, and receiving the radar wave reflected by the target, thereby acquiring distribution information of the target including a distance to the target and an azimuth of the target. As the radar wave, a laser, a microwave, a millimeter wave, an ultrasonic wave, or the like can be appropriately used.

In the present embodiment, as shown in FIG. 1, five radars 13 are provided, specifically, three on a front side and two on a rear side. The distribution information of the target acquired by the radar 13 is transmitted to the vehicle control device 100 via a communication medium.

The LIDAR (Light Detection and Ranging) 15 has, for example, a function of detecting presence or absence of a target and a distance to the target by measuring time required for detection of scattered light relative to irradiation light. In the present embodiment, as shown in FIG. 1, five LIDARs 15 are provided, specifically, two on the front side and three on the rear side. The distribution information of the target acquired by the LIDAR 15 is transmitted to the vehicle control device 100 via a communication medium.

[Navigation Device 20]

The navigation device 20 includes a global navigation satellite: system (GNSS) receiver, map information (navigation map), a touch panel type internal display device 61 functioning as a human machine interface, a speaker 63 (see FIG. 3), a microphone, and the like. The navigation device 20 serves to calculate a current position of the own vehicle M by the GNSS receiver and to derive a route from the current position to a destination designated by a user.

The route derived by the navigation device 20 is provided to a target lane determination unit 110 (to be described below) of the vehicle control device 100. The current position of the own vehicle M may be specified or complemented by an inertial navigation system (INS) using an output of a vehicle sensor 30 (see FIG. 2). When the vehicle control device 100 executes a manual driving mode, the navigation device 20 provides guidance on a route to a destination by voice or map display.

The function for calculating the current position of the own vehicle M may be provided independently of the navigation device 20. The navigation device 20 may be implemented by, for example, a function of a terminal device (hereinafter, also referred to as a "terminal device") such as a smartphone or a tablet terminal carried by a user. In this case, transmission and reception of information is performed between the terminal device and the vehicle control device 100 by wireless or wired communication.

[Configurations of Vehicle Control Device 100 and Peripheral Portion Thereof]

Next, configurations of the vehicle control device 100 mounted on the own vehicle M and a peripheral portion thereof will be described with reference to FIG. 2.

Figure 2:
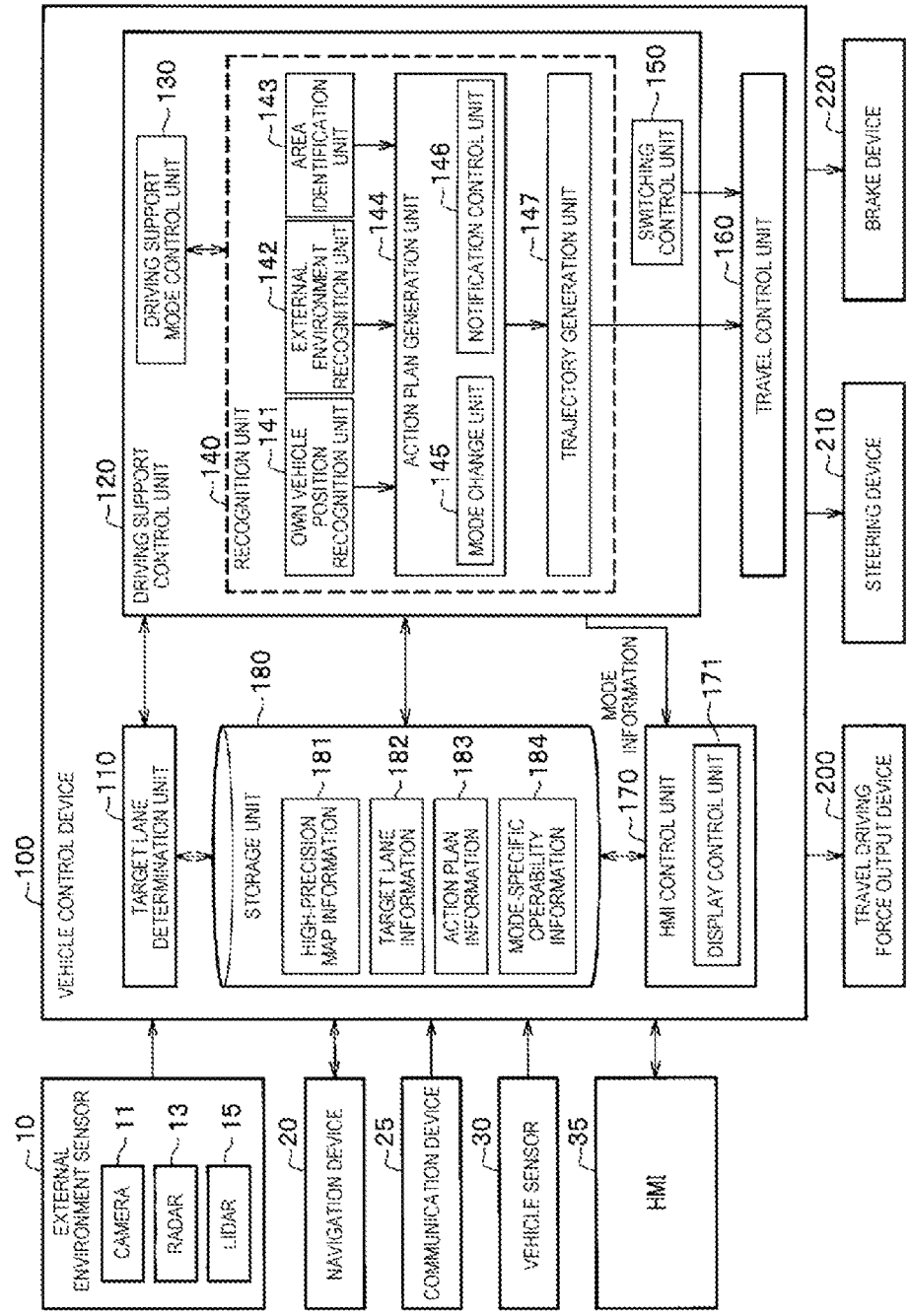
FIG. 2 is a functional block configuration diagram showing configurations of a vehicle control device including an autonomous driving vehicle information presentation device according to the embodiment of the present invention and a peripheral portion thereof.

FIG. 2 is a functional block configuration diagram showing the configurations of the vehicle control device 100 according to the embodiment of the present invention and the peripheral portion thereof.

As shown in FIG. 2, in addition to the external environment sensor 10, the navigation device 20, and the vehicle control device 100 described above, a communication device 25, the vehicle sensor 30, a human machine interface (HMI) 35, a travel driving force output device 200, a steering device 210, and a brake device 220 are mounted on the own vehicle M.

The communication device 25, the vehicle sensor 30, the HMI 35, the travel driving force output device 200, the steering device 210, and the brake device 220 are connected to the vehicle control device 100 via a communication medium so as to be capable of performing data communication with the vehicle control device 100.

[Communication Device 25]

The communication device 25 has a function of performing communication via a wireless communication medium such as a cellular network, a Wi-Fi network, Bluetooth (registered trademark), or dedicated short range communication (DSRC).

The communication device 25 performs wireless communication with an information providing server of a system that monitors a traffic condition of a road such as the Vehicle Information and Communication System (VICS) (registered trademark), and acquires traffic information indicating a traffic condition of a road on which the own vehicle M is traveling or is scheduled to travel. The traffic information includes information on traffic congestion in front of the own vehicle M, information on time required for passing through a traffic congestion point, information on accidents, failed vehicles and constructions, information on speed regulation and lane regulation, position information of parking lots, information on whether a parking lot, service area or parking area is full or vacant, and the like.

The communication device 25 may acquire the traffic information by performing communication with a wireless beacon provided on a road side band or the like or performing vehicle-vehicle communication with another vehicle traveling around the own vehicle M.

For example, the communication device 25 performs wireless communication with an information providing server of traffic signal prediction systems (TSPS), and acquires signal information on a traffic light provided on a road on which the own vehicle M is traveling or is scheduled to travel. The TSPS serves to support driving for smoothly passing through a signalized intersection by using signal information of the traffic light.

The communication device 25 may acquire the signal information by performing communication with an optical beacon provided on a road side band or the like or performing vehicle-vehicle communication with another vehicle traveling around the own vehicle M.

Here, the signal information includes, for example, information indicating a current light content of the traffic light. As a specific example, if a current light content of a certain traffic light is a red light, signal information corresponding to the traffic light includes information indicating that the current light content is a red light. The signal information also includes, for example, information indicating a future light schedule of the traffic light. As a specific example, if a traffic light that is currently a red light is scheduled to change to a green light after 10 seconds, the signal information corresponding to the traffic light includes information indicating that the traffic light is scheduled to change to the green light after 10 seconds.

However, for example, on a road having a plurality of lanes on each side, such as a straight or left turn lane and a right turn lane, an arrow-type traffic light indicating that traveling in a direction of an arrow is allowed even during a yellow light or a red light (for example, a right turn is allowed) may he provided. In the present embodiment, the signal information corresponding to such an arrow-type traffic light includes information indicating a current light content and a future light schedule of the traffic light corresponding to each lane.

As a specific example, it is assumed that an arrow-type traffic light capable of lighting a right turn arrow is provided on a road having two lanes on each side including a straight or left turn lane and a right turn lane. It is assumed that the arrow-type traffic light is currently a red light with a right turn arrow, in this case, the signal information corresponding to such an arrow-type traffic light includes information indicating "red light" corresponding to the straight or left turn lane and information indicating "right turn arrow light" corresponding to the right turn lane. The signal information corresponding to such an arrow-type traffic light may include, for example, information indicating a light schedule of the right turn arrow (specifically, for example, information indicating a remaining time of the right turn arrow light).

[Vehicle Sensor 30]

The vehicle sensor 30 has a function of detecting various types of information relating to the own vehicle M. The vehicle sensor 30 includes a vehicle speed sensor that detects a vehicle speed of the own vehicle M, an acceleration sensor that detects an acceleration of the own vehicle M, a yaw-rate sensor that detects an angular velocity around a vertical axis of the own vehicle M, an azimuth sensor that detects orientation of the own vehicle M, an inclination angle sensor that detects an inclination angle of the own vehicle M, an illuminance sensor that detects illuminance of a place where the own vehicle M is present, a raindrop sensor that detects an amount of raindrops of the place where the own vehicle M is present, and the like.

[Configuration of HMI 35]

Next, the HMI 35 will be described with reference to FIGS. 3, 4, 5A, and 5B.

Figure 3:
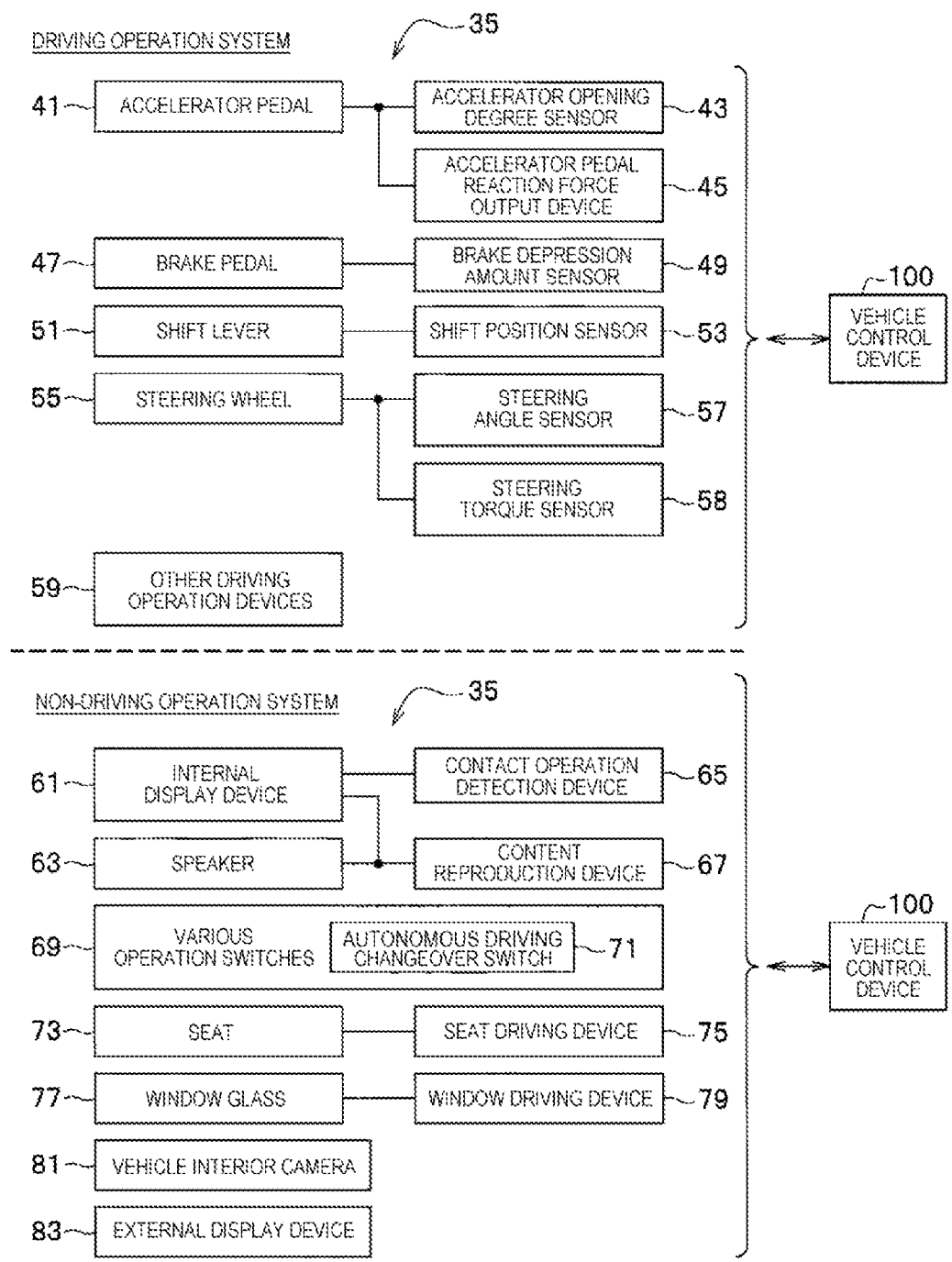
FIG. 3 is a schematic configuration diagram of an HMI provided in the autonomous driving vehicle information presentation device.
Figure 4:
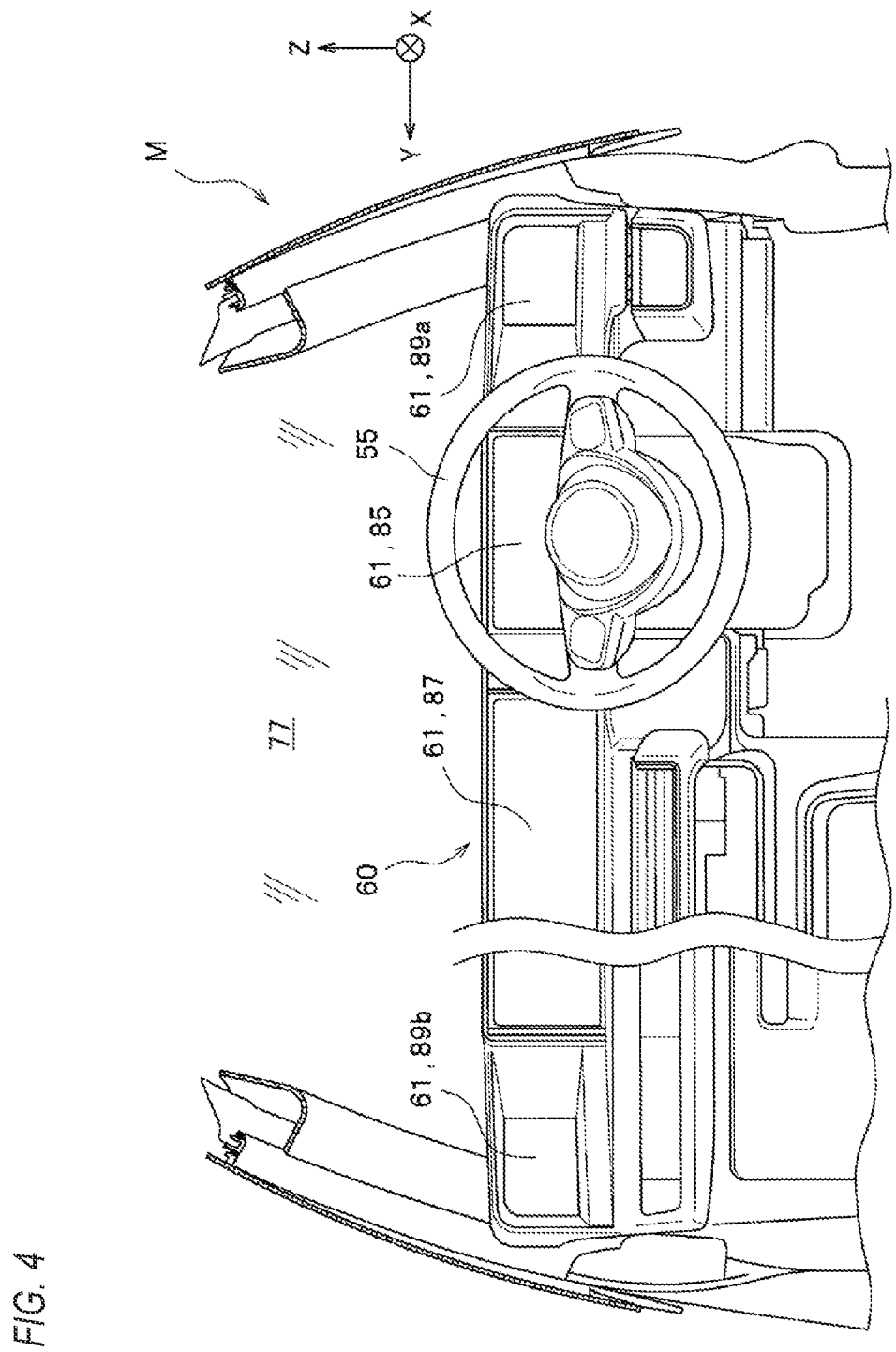
FIG. 4 shows a vehicle interior front structure of an autonomous driving vehicle.
Figure 5A:
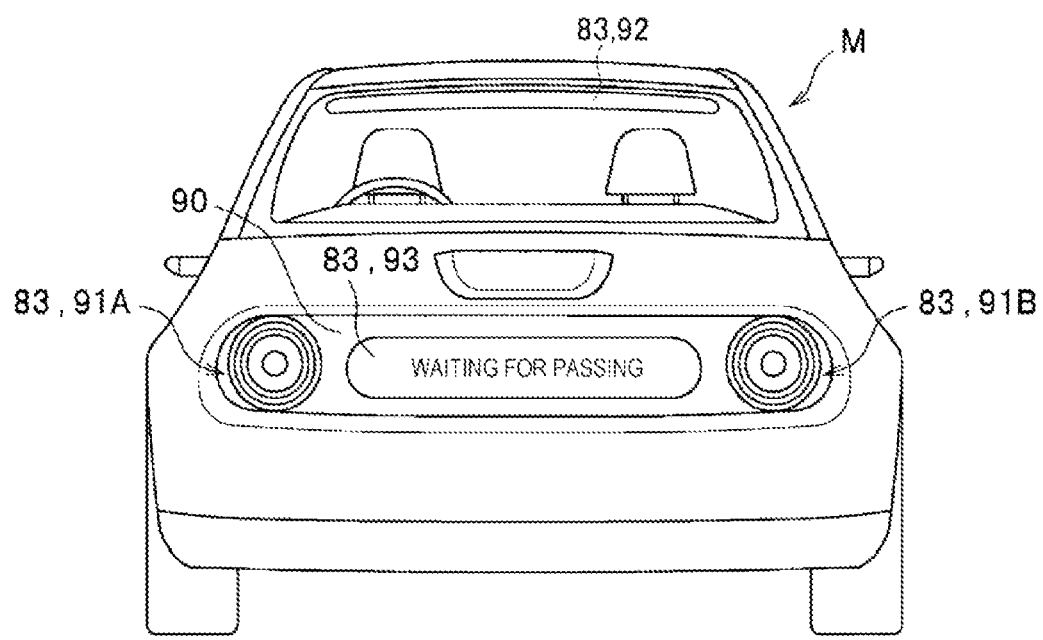
FIG. 5A is an external view showing a front structure of the autonomous driving vehicle.
Figure 5B:
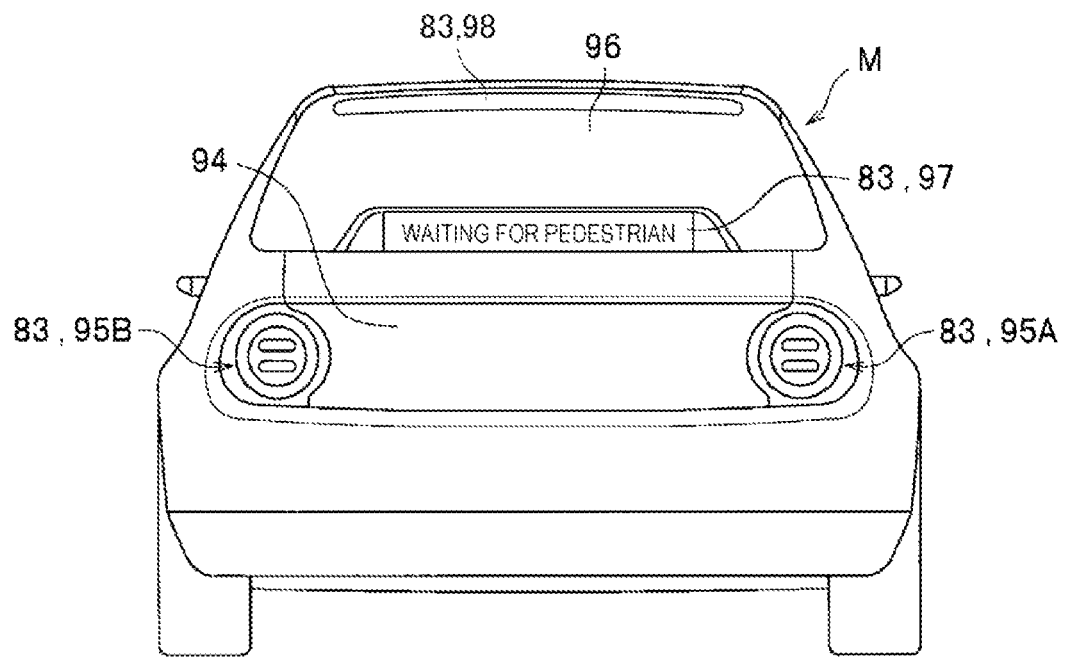
FIG. 5B is an external view showing a rear structure of the autonomous driving vehicle.

FIG. 3 is a schematic configuration diagram of the HMI 35 connected to the vehicle control device 100 according to the embodiment of the present invention. FIG. 4 shows a vehicle interior front structure of the vehicle M including the vehicle control device 100. FIGS. 5A and 5B are external views shows a front structure and a rear structure of the vehicle M including the vehicle control device 100, respectively.

As shown in FIG. 3, the HMI 35 includes components of a driving operation system and components of a non-driving operation system. A boundary between the components of the driving operation system and the components of the non-driving operation system is not clear, and the components of the driving operation system may also be configured to have functions of the non-driving operation system (or vice versa).

The HMI 35 includes, as the components of the driving operation system, an accelerator pedal 41, an accelerator opening degree sensor 43, an accelerator pedal reaction force output device 45, a brake pedal 47, a brake depression amount sensor 49, a shift lever 51, a shift position sensor 53, a steering wheel 55, a steering angle sensor 57, a steering torque sensor 58, and other driving operation devices 59.

The accelerator pedal 41 is an acceleration operator for receiving an acceleration instruction (or a deceleration instruction by a return operation) from a driver. The accelerator opening degree sensor 43 detects a depression amount of the accelerator pedal 41, and outputs an accelerator opening degree signal indicating the depression amount to the vehicle control device 100. Instead of outputting the accelerator opening degree signal to the vehicle control device 100, a configuration in which the accelerator opening degree signal is directly output to the travel driving force output device 200, the steering device 210, or the brake device 220 may be adopted. The same applies to other configurations of the driving operation system described below. The accelerator pedal reaction force output device 45 outputs a force (operation reaction force) in a direction opposite to an operation direction relative to the accelerator pedal 41, for example, in response to an instruction from the vehicle control device 100.

The brake pedal 47 is a deceleration operation element configured to receive a deceleration instruction given by the driver. The brake depression amount sensor 49 detects a depression amount (or a depression force) of the brake pedal 47, and outputs a brake signal indicating a detection result thereof to the vehicle control device 100.

The shift lever 51 is a speed changing operation element configured to receive a shill stage change instruction given by the driver. The shift position sensor 53 detects a shift stage instructed by the driver, and outputs a shift position signal indicating a detection result thereof to the vehicle control device 100.

The steering wheel 55 is a steering operation element configured to receive a turning instruction given by the driver. The steering angle sensor 57 detects an operation angle of the steering wheel 55, and outputs a steering angle signal indicating a detection result thereof to the vehicle control device 100. The steering torque sensor 58 detects torque applied to the steering wheel 55, and outputs a steering torque signal indicating a detection result thereof to the vehicle control device 100.

The other driving operation device 59 is, for example, a joystick, a button, a dial switch, a graphical user interface (GUI) switch, and the like. The other driving operation device 59 receives an acceleration instruction, a deceleration instruction, a turning instruction, and the like, and outputs the received instructions to the vehicle control device 100.

Further, the HMI 35 includes, as the components of the non-driving operation system, the internal display device 61, the speaker 63, a contact operation detection device 65, a content reproduction device 67, various operation switches 69, a seat 73 and a seat driving device 75, a window glass 77 and a window driving device 79, a vehicle interior camera 81, and an external display device 83, for example.

The internal display device 61 is preferably a touch panel type display device having a function of displaying various types of information for an occupant in the vehicle interior. As shown in FIG. 4, the internal display device 61 includes, in an instrument panel 60, a meter panel 85 that is provided at a position directly facing a driver seat, a multi-information panel 87 that is provided to face the driver seat and a passenger seat and is horizontally long in a vehicle width direction (a Y-axis direction of FIG. 4), a right panel 89*a* that is provided on a driver seat side in the vehicle width direction, and a left panel 89*b* that is provided on a passenger seat side in the vehicle width direction. The internal display device 61 may be additionally provided at a position facing a rear seat (on a back side of a front seat).

The meter panel 85 displays, for example, a speedometer, a tachometer, an odometer, shift position information, lighting status information of lights, and the like.

The multi-information panel 87 displays, for example, various types of information such as map information on surroundings of the own vehicle M, current position information of the own vehicle M on a map, traffic information (including signal information) on a current traveling path or a scheduled route of the own vehicle M, traffic participant information on traffic participants (including pedestrians, bicycles, motorcycles, other vehicles, and the like) existing around the own vehicle M, and messages issued to the traffic participants.

The right panel 89*a* displays image information on a rear side and a lower side on the right side of the own vehicle M imaged by the camera 11 provided on the right side of the own vehicle M.

The left panel 89*b* displays image information on a rear side and a lower side on the left side of the own vehicle M imaged by the camera 11 provided on the left side of the own vehicle M.

The internal display device 61 is not particularly limited, and may be configured with, for example, a liquid crystal display (LCD), an organic electroluminescence (EL) display, or the like. The internal display device 61 may be configured with a head-up display (HUD) that projects a required image on the window glass 77.

The speaker 63 has a function of outputting a sound. An appropriate number of the speakers 63 are provided at appropriate positions such as the instrument panel 60, a door panel, and a rear parcel shelf (all of which are not shown) in the vehicle interior, for example.

When the internal display device 61 is of a touch panel type, the contact operation detection device 65 functions to detect a touch position on a display screen of the internal display device 61, and output information on the detected touch position to the vehicle control device 100. When the internal display device 61 is not of the touch panel type, the contact operation detection device 65 may not be provided.

The content reproduction device 67 includes, for example, a digital versatile disc (DVD) reproduction device, a compact disc (CD) reproduction device, a television receiver, and a device for generating various guide images. A part or all of the internal display device 61, the speaker 63, the contact operation detection device 65, and the content reproduction device 67 may be configured to be common to the navigation device 20.

The various operation switches 69 are provided at appropriate positions in the vehicle interior. The various operation switches 69 include an autonomous driving changeover switch 71 that instructs immediate start (or future start) and stop of autonomous driving. The autonomous driving changeover switch 71 may be a graphical user interface (GUI) switch or a mechanical switch. The various operation switches 69 may include switches configured to drive the seat driving device 75 and the window driving device 79.

The seat 73 is a seat where an occupant of the own vehicle M sits. The seat driving device 75 freely drives a reclining angle, a front-rear direction position, a yaw angle, and the like of the seat 73. The window glass 77 is provided, for example, in each door. The window driving device 79 drives the window glass 77 to open and close.

The vehicle interior camera 81 is a digital camera using a solid-state imaging element such as a CCD or a CMOS. The vehicle interior camera 81 is provided at a position that enables imaging of at least a head portion of a driver seated in the driver seat, such as a rearview mirror, a steering boss portion (both of which are not shown), and the instrument panel 60. For example, the vehicle interior camera 81 periodically and repeatedly images a state of the vehicle interior including the driver.

The external display device 83 has a function of displaying (informing) various types of information for traffic participants (including pedestrians, bicycles, motorcycles, other vehicles, and the like) existing around the own vehicle M. As shown in FIG. 5A, the external display device 83 provided in a front portion of the own vehicle M includes, in a front grille 90 of the own vehicle M, a right front lighting unit 91A and a left front lighting unit 91B that are provided apart from each other in the vehicle width direction, and a front display unit 93 provided between the left and right front lighting units 91A and 91B.

The external display device 83 provided in the front portion of the own vehicle M further includes a front indicator 92. When the own vehicle M is moved by autonomous travel control of the vehicle control device 100, that is, when the own vehicle M is moved by autonomous driving, the front indicator 92 is lighted toward the front side of the own vehicle M, and informs a traffic participant existing in front of the own vehicle M that the own vehicle M is moved by autonomous driving.

As shown in FIG. 5B, the external display device 83 provided in a rear portion of the own vehicle M includes, in a rear grille 94 of the own vehicle M, a right rear lighting unit 95A and a left rear lighting unit 95B that are provided apart from each other in the vehicle width direction, and a rear display unit 97 that is provided in the vehicle interior of the own vehicle M at a position visible from the outside through a central lower portion of a rear window 96. The rear display unit 97 is provided, for example, at an opening lower end portion (not shown) of the rear window 96.

The external display device 83 provided in the rear portion of the own vehicle M further includes a rear indicator 98. When the own vehicle M is moved by autonomous travel control of the vehicle control device 100, that is, when the own vehicle M is moved by autonomous driving, the rear indicator 98 is lighted toward the rear side of the own vehicle M, and informs a traffic participant existing behind the own vehicle M that the own vehicle M is moved by autonomous driving.

Note that a right indicator may be provided such that, when the own vehicle M is moved by autonomous driving, the right indicator is lighted toward a right side of the own vehicle M and informs a traffic participant existing on the right side of the own vehicle M that the own vehicle M is moved by autonomous driving. Detailed description and illustration thereof are omitted. Similarly, a left indicator may be provided such that, when the own vehicle M is moved by autonomous driving, the left indicator is lighted toward a left side of the own vehicle M and informs a traffic participant existing on the left side of the own vehicle M that the own vehicle M is moved by autonomous driving.

Figure 5C:
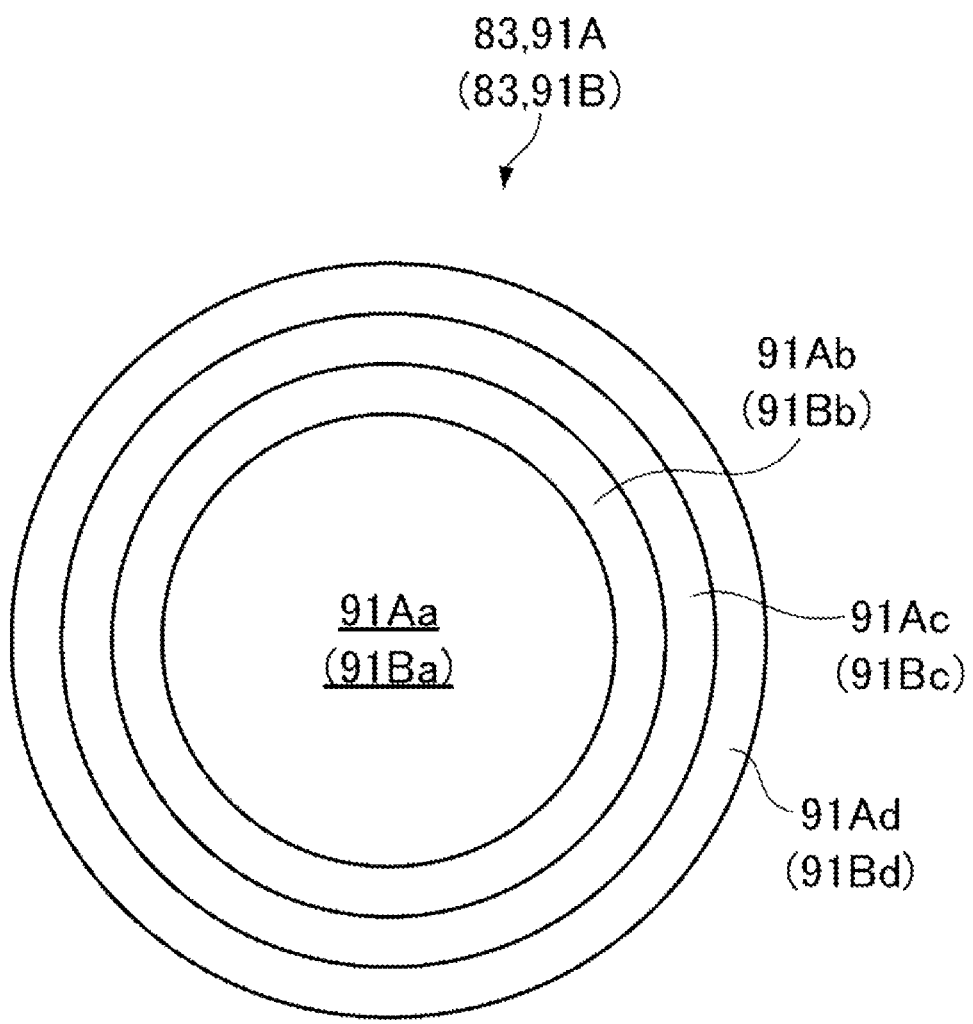
FIG. 5C is a front view showing a schematic configuration of left and right front lighting units provided in the autonomous driving vehicle.

Here, a configuration of the left and right front lighting units 91A and 91B of the external display device 83 will be described with reference to FIG. 5C. FIG. 5C is a front view showing a schematic configuration of the left and right front lighting units 91A and 91B provided in the own vehicle M. Since the left and right front lighting units 91A and 91B have the same configuration, only one front lighting unit is shown in FIG. 5C. In the following description of FIG. 5C, reference signs without parentheses in FIG. 5C are referred to in description of the right front lighting unit 91A, and reference signs in parentheses in FIG. 5C are referred to in description of the left front lighting unit 91B.

The right front lighting unit 91A is formed in a circular shape as viewed from the front. The right front lighting unit 91A is configured such that a direction indicator 91Ab, lighting display unit 91Ac, and a position lamp 91Ad, each of which is formed in an annular shape, are sequentially arranged concentrically outward in a radial direction around a headlamp 91Aa, which is formed in a circular shape as viewed from the front and has a smaller diameter dimension than an outer diameter dimension of the right front lighting unit 91A.

The headlamp 91Aa serves to assist a front field of view of the occupant by emitting light forward in the traveling direction of the own vehicle M while the own vehicle M travels in a dark place. When the own vehicle M turns right or left, the direction indicator 91Ab serves to notify traffic participants existing around the own vehicle M of the intention of turning right or left. For example, the lighting display unit 91Ac is provided for communication with the user (including an owner) of the own vehicle M in combination with display contents of the front display unit 93. The position lamp 91Ad serves to notify the traffic participants existing around the own vehicle M of a vehicle width of the own vehicle M while the own vehicle M travels in a dark place.

Similarly to the right front lighting unit 91A, the left front lighting unit 91B is also configured such that a direction indicator 91Bb, a lighting display unit 91Bc, and a position lamp 91Bd, each of which is formed in an annular shape, are sequentially arranged concentrically outward in the radial direction around a headlamp 91Ba formed in a circular shape as viewed from the front. The left and right front lighting units 91A and 91B (for example, the left and right lighting display units 91Ac and 91Bc) are used for information presentation by an information presentation unit 331 to be described later below.

[Configuration of Vehicle Control Device 100]

Next, referring back to FIG. 2, the configuration of the vehicle control device 100 will be described.

The vehicle control device 100 is implemented by, for example, one or more processors or hardware having equivalent functions. The vehicle control device 100 may be configured by combining an electronic control unit (ECU), a micro-processing unit (MPU), or the like in which a processor such as a central processing unit (CPU), a storage device, and a communication interface are connected by an internal bus.

The vehicle control device 100 includes the target lane determination unit 110, a driving support control unit 120, a travel control unit 160, an HMI control unit 170, and a storage unit 180.

Functions of the target lane determination unit 110 and the driving support control unit 120, and a part or all of functions of the travel control unit 160 are implemented by a processor executing a program (software). A part or all of such functions may be implemented by hardware such as large scale integration (LSI) or an application specific integrated circuit (ASIC), or may be implemented by a combination of software and hardware.

In the following description, when an "XX unit" is mainly described, it is assumed that the driving support control unit 120 reads each program from a ROM or electrically erasable programmable read-only memory (EEPROM) as necessary, then loads the program onto a RAM, and executes each function (which will be described later below). Each program may be stored in the storage unit 180 in advance, or may be loaded onto the vehicle control device 100 via another storage medium or communication medium as necessary.

[Target Lane Determination Unit 110]

The target lane determination unit 110 is implemented by, for example, a micro-processing unit (MPU). The target lane determination unit 110 divides a route provided from the navigation device 20 into a plurality of blocks (for example, divides the route every 100 in relative to a vehicle traveling direction), and determines a target lane for each block with reference to high-precision map information 181. For example, the target lane determination unit 110 determines which lane from the left the vehicle is to travels in. For example, in a case where a branching point, a merging point, or the like exists in the route, the target lane determination unit 110 determines a target lane such that the own vehicle M can travel along a reasonable travel route so as to travel to a branch destination. The target lane determined by the target lane determination unit 110 is stored in the storage unit 180 as target lane information 182.

[Driving Support Control Unit 120]

The driving support control unit 120 includes a driving support mode control unit 130, a recognition unit 140, and a switching control unit 150.

<Driving Support Mode Control Unit 130>

The driving support mode control unit 130 determines an autonomous driving mode (autonomous driving support state) to be executed by the driving support control unit 120, based on an operation of the driver on the HMI 35, an event determined by an action plan generation unit 144, a traveling mode determined by a trajectory generation unit 147, and the like. The autonomous driving mode is notified to the HMI control unit 170.

In any autonomous driving mode, it is possible to switch (override) to a lower-ranking autonomous driving mode by an operation on a component of the driving operation system in the HMI 35.

The override is started, for example, in a case where an operation on a component of the driving operation system of the HMI 35 performed by the driver of the own vehicle M continues for more than a predetermined time, in a case where a predetermined operation change amount (for example, an accelerator opening degree of the accelerator pedal 41, a brake depression amount of the brake pedal 47, or a steering angle of the steering wheel 55) is exceeded, or in a case where an operation on a component of the driving operation system is performed for more than a predetermined number of times.

<Recognition Unit 140>

The recognition unit 140 includes an own vehicle position recognition unit 141, an external environment recognition unit 142, an area identification unit 143, the action plan generation unit 144, and the trajectory generation unit 147.

<Own Vehicle Position Recognition Unit 141>

The own vehicle position recognition unit 141 recognizes a traveling lane where the own vehicle M travels (that is, a lane where the own vehicle M is currently located) and a relative position of the own vehicle M relative to the traveling lane, based on the high-precision map information 181 stored in the storage unit 180 and information input from the camera 11, the radar 13, the LIDAR 15, the navigation device 20, or the vehicle sensor 30.

The own vehicle position recognition unit 141 recognizes the traveling lane by comparing a pattern (for example, arrangement of solid lines and broken lines) of road lane marking recognized from the high-precision map information 181 with a pattern of road lane marking around the own vehicle M recognized from an image imaged by the camera 11. During such recognition, a current position of the own vehicle M acquired from the navigation device 20 or a processing result of the INS may be taken into consideration.

<External Environment Recognition Unit 142>

As shown in FIG. 2, the external environment recognition unit 142 recognizes, for example, an external environment state including a position, a vehicle speed, and acceleration of a surrounding vehicle based on external environment information input from the external environment sensor 10 including the camera 11, the radar 13, and the LIDAR 15. The surrounding vehicle is, for example, a vehicle traveling around the own vehicle M, and is another vehicle traveling in the same direction as the own vehicle M (a preceding vehicle and a following vehicle to be described later below).

The position of the surrounding vehicle may be indicated by a representative point such as a center of gravity or a corner of the other vehicle, or may be indicated by a region represented by a contour of the other vehicle. A state of the surrounding vehicle may include a speed and acceleration of the surrounding vehicle and whether the surrounding vehicle is changing a lane (or whether the surrounding vehicle is attempting to change a lane), which are grasped based on information of the various devices described above. The external environment recognition unit 142 may be configured to recognize a position of a target including a guardrail, a utility pole, a parked vehicle, a pedestrian, and a traffic sign, in addition to surrounding vehicles including a preceding vehicle and a following vehicle.

In the present embodiment, among surrounding vehicles, a vehicle that travels in a traveling lane common to the own vehicle M immediately in front of the own vehicle M and is a follow-up target during follow-up travel control is referred to as a "preceding vehicle". In addition, among the surrounding vehicles, a vehicle that travels in a traveling lane common to the own vehicle M and immediately behind the own vehicle M is referred to as a "following vehicle".

<Area Identification Unit 143>

Based on map information, the area identification unit 143 acquires information on a specific area (interchange (IC)/junction (JCT)/lane increase and decrease point) existing around the own vehicle M. Accordingly, even in a case where a traveling direction image cannot be acquired via the external environment sensor 10 due to blockage of front vehicles including the preceding vehicle, the area identification unit 143 can acquire the information on the specific area that assists smooth traveling of the own vehicle M.

Instead of acquiring the information on the specific area based on the map information, the area identification unit 143 may acquire the information on the specific area by identifying a target by image processing based on the traveling direction image acquired via the external environment sensor 10 or by recognizing the target based on a contour of the traveling direction image by internal processing of the external environment recognition unit 142.

In addition, as will be described later below, a configuration in which accuracy of the information on the specific area acquired by the area identification unit 143 is increased by using VICS information acquired by the communication device 25 may be adopted.

<Action Plan Generation Unit 144>

The action plan generation unit 144 sets a start point of autonomous driving and/or a destination of autonomous driving. The start point of autonomous driving may be a current position of the own vehicle M or may be a point where an operation that instructs autonomous driving is performed. The action plan generation unit 144 generates an action plan for a section between the start point and the destination of autonomous driving. Note that the action plan generation unit 144 is not limited thereto, and may generate an action plan for any section.

The action plan includes, for example, a plurality of events to be sequentially executed. The plurality of events include, for example, a deceleration event of decelerating the own vehicle M, an acceleration event of accelerating the own vehicle M, a lane keep event of causing the own vehicle M to travel without deviating from a traveling lane, a lane change event of changing a traveling lane, an overtaking event of causing the own vehicle M to overtake a preceding vehicle, a branching event of causing the own vehicle M to change to a desired lane at a branching point or causing the own vehicle M to travel without deviating from a current traveling lane, a merging event of accelerating and decelerating the own vehicle M in a merging lane so as to merge with a main lane and changing the traveling lane, and a handover event of causing the own vehicle M to transition from a manual driving mode to an autonomous driving mode (autonomous driving support state) at a starting point of autonomous driving or causing the own vehicle M to transition from the autonomous driving mode to the manual driving mode at a scheduled end point of autonomous driving.

The action plan generation unit 144 sets a lane change event, a branching event, or a merging event at a place where the target lane determined by the target lane determination unit 110 is switched. Information indicating the action plan generated by the action plan generation unit 144 is stored in the storage unit 180 as action plan information 183.

The action plan generation unit 144 includes a mode change unit 145 and a notification control unit 146.

<Mode Change Unit 145>

For example, based on a recognition result of a target existing in the traveling direction of the own vehicle M provided by the external environment recognition unit 142, the mode change unit 145 selects a driving mode corresponding to the recognition result from driving modes including a preset multi-stage autonomous driving mode and a manual driving mode, and uses the selected driving mode to perform a driving operation of the own vehicle M.

<Notification Control Unit 146>

When a driving mode of the own vehicle M is transitioned by the mode change unit 145, the notification control unit 146 notifies that the driving mode of the own vehicle M is transitioned. The notification control unit 146 notifies the fact that the driving mode of the own vehicle M is transitioned, for example, by causing the speaker 63 to output sound information stored in advance in the storage unit 180.

As long as the driver of the own vehicle can be notified of the transition of the driving mode of the own vehicle M, the notification is not limited to the notification by sound, and the notification may also be performed by display, light emission, vibration, or a combination thereof.

<Trajectory Generation Unit 147>

The trajectory generation unit 147 generates a trajectory along which the own vehicle M is to travel based on the action plan generated by the action plan generation unit 144.

<Switching Control Unit 150>

As shown in FIG. 2, the switching control unit 150 switches between the autonomous driving mode and the manual driving mode based on a signal input from the autonomous driving changeover switch 71 (see FIG. 3) and the like. In addition, based on an operation that instructs acceleration, deceleration, or steering relative to a component of the driving operation system in the HMI 35, the switching control unit 150 switches the autonomous driving mode at that time to a lower-ranking driving mode. For example, when a state where an operation amount indicated by a signal input from the component of the driving operation system in the HMI 35 exceeds a threshold continues for a reference time or more, the switching control unit 150 switches (overrides) the autonomous driving mode at that time to a lower-ranking driving mode.

In addition, the switching control unit 150 may perform switching control for returning to an original autonomous driving mode in a case where no operation is detected on any component of the driving operation system in the HMI 35 within a predetermined time after the switching to the lower-ranking driving mode by the override.

<Travel Control Unit 160>

The travel control unit 160 performs travel control of the own vehicle M by controlling the travel driving force output device 200, the steering device 210, and the brake device 220 in such a manner that the own vehicle M passes a trajectory generated by the trajectory generation unit 147 on which the own vehicle M is to travel at a preset time-point.

<HMI Control Unit 170>

When selling information on the autonomous driving mode of the own vehicle M is notified by the driving support control unit 120, the HMI control unit 170 refers to mode-specific operability information 184 indicating, for each driving mode, a device permitted to be used (a part or all of the navigation device 20 and the HMI 35) and a device not permitted to be used, and controls the HMI 35 according to setting contents of the autonomous driving mode. As shown in FIG. 2, the HMI control unit 170 determines the device permitted to be used (a part or all of the navigation device 20 and the HMI 35) and the device not permitted to be used, based on driving mode information of the own vehicle M acquired from the driving support control unit 120 and by referring to the mode-specific operability information 3 84. Based on a determination result thereof, the HMI control unit 170 controls whether to accept a driver operation related to the HMI 35 of the driving operation system or the navigation device 20.

For example, when a driving mode executed by the vehicle control device 100 is the manual driving mode, the HMI control unit 170 accepts a driver operation related to the HMI 35 of the driving operation system (for example, the accelerator pedal 41, the brake pedal 47, the shift lever 51, and the steering wheel 55 in FIG. 3).

The HMI control unit 170 includes a display control unit 171.

<Display Control Unit 171>

The display control unit 171 performs display control related to the internal display device 61 and the external display device 83. Specifically, for example, when the driving mode executed by the vehicle control device 100 is an autonomous driving mode with a high degree of automation, the display control unit 171 performs control such that the internal display device 61 and/or the external display device 83 display information such as attention calling, warning, and driving assistance for traffic participants existing around the own vehicle M. This will be described in detail later below <Storage Unit 180>

The storage unit 180 stores information such as the high-precision map information 181, the target lane information 182, the action plan information 183, and the mode-specific operability information 184. The storage unit 180 is implemented by a read only memory (ROM), a random access memory (RAM), a hard disk drive (HDD), a flash memory, or the like. A program to be executed by a processor may be stored in advance in the storage unit 180, or may be downloaded from an external device via an in-vehicle Internet device or the like. In addition, the program may be installed in the storage unit 180 when a portable storage medium storing the program is mounted on a drive device (not shown).

The high-precision map information 181 is map information with higher precision than map information normally provided in the navigation device 20. The high-precision map information 181 includes, for example, information on a center of a lane and information on a boundary of the lane. The boundary of the lane includes a lane mark type, a color, a length, a road width, a road shoulder width, a main line width, a lane width, a boundary position, a boundary type (guardrail, planting, curbstone), a zebra zone, and the like, and these boundaries are included in a high-precision map.

The high-precision map information 181 may include road information, traffic regulation information, address information (address and postal code), facility information, telephone number information, and the like. The road information includes information indicating a road type such as an expressway, a toll road, a national highway, and a prefectural road, and information such as the number of lanes of a road, a width of each lane, a gradient of a road, a position of a road (three-dimensional coordinates including longitude, latitude, and height), a curve curvature of a lane, positions of merging and branching points of lanes, and signs provided on a road. The traffic regulation information includes, for example, information indicating that a lane is blocked due to construction, a traffic accident, traffic congestion, or the like.

[Travel Driving Force Output Device 200, Steering Device 210, and Brake Device 220]

As shown in FIG. 2, the vehicle control device 100 controls driving of the travel driving force output device 200, the steering device 210, and the brake device 220 in accordance with a travel control command of the travel control unit 160.

<Travel Driving Force Output Device 200>

The travel driving force output device 200 outputs a driving force (torque) for the own vehicle M to travel to driving wheels. For example, when the own vehicle M is an automobile using an internal combustion engine as a power source, the travel driving force output device 200 includes an internal combustion engine, a transmission, and an engine electronic control unit (ECU) that controls the internal combustion engine (all of which are not shown).

When the own vehicle M is an electric automobile using an electric motor as a power source, the travel driving force output device 200 includes a travel motor and a motor ECU that controls the travel motor (both of which are not shown).

Further, when the own vehicle M is a hybrid automobile, the travel driving force output device 200 includes an internal combustion engine, a transmission, an engine ECU, a travel motor, and a motor ECU (all of which are not shown).

When the travel driving force output device 200 includes only the internal combustion engine, the engine ECU adjusts a throttle opening degree, a shift stage, and the like of the internal combustion engine in accordance with information input from the travel control unit 160 to be described later below.

When the travel driving force output device 200 includes only the travel motor, the motor ECU adjusts a duty ratio of a PWM signal provided to the travel motor in accordance with information input from the travel control unit 160.

When the travel driving force output device 200 includes the internal combustion engine and the travel motor, the engine ECU and the motor ECU control a travel driving force in cooperation with each other in accordance with information input from the travel control unit 160.

<Steering Device 210>

The steering device 210 includes, for example, a steering ECU and an electric motor (both of which are not shown). The electric motor, for example, changes a direction of a steered wheel by applying a force to a rack and pinion mechanism. The steering ECU drives the electric motor in accordance with information input from the vehicle control device 100 or input information on a steering angle or on steering torque to change the direction of the steered wheel.

<Brake Device 220>

The brake device 220 is, for example, an electric servo brake device including a brake caliper, a cylinder that transmits hydraulic pressure to the brake caliper, an electric motor that generates the hydraulic pressure in the cylinder, and a braking control unit (all of which are not shown). The braking control unit of the electric servo brake device controls the electric motor according to information input from the travel control unit 160 in such a manner that brake torque corresponding to a braking operation is output to each wheel. The electric servo brake device may include, as a backup, a mechanism that transmits hydraulic pressure generated by an operation of the brake pedal 47 to the cylinder via a master cylinder.

The brake device 220 is not limited to the electric servo brake device described above, and may also be an electronically controlled hydraulic brake device. The electronically controlled hydraulic brake device controls an actuator in accordance with information input from the travel control unit 160 to transmit hydraulic pressure of a master cylinder to the cylinder. The brake device 220 may include a regenerative brake using a travel motor that may be included in the travel driving force output device 200.

[Block Configuration of Autonomous driving Vehicle Information Presentation Device 300]

Next, a block configuration of an autonomous driving vehicle information presentation device 300 according to the embodiment of the present invention included in the vehicle control device 100 described above will be described with reference to FIG. 6.

Figure 6:
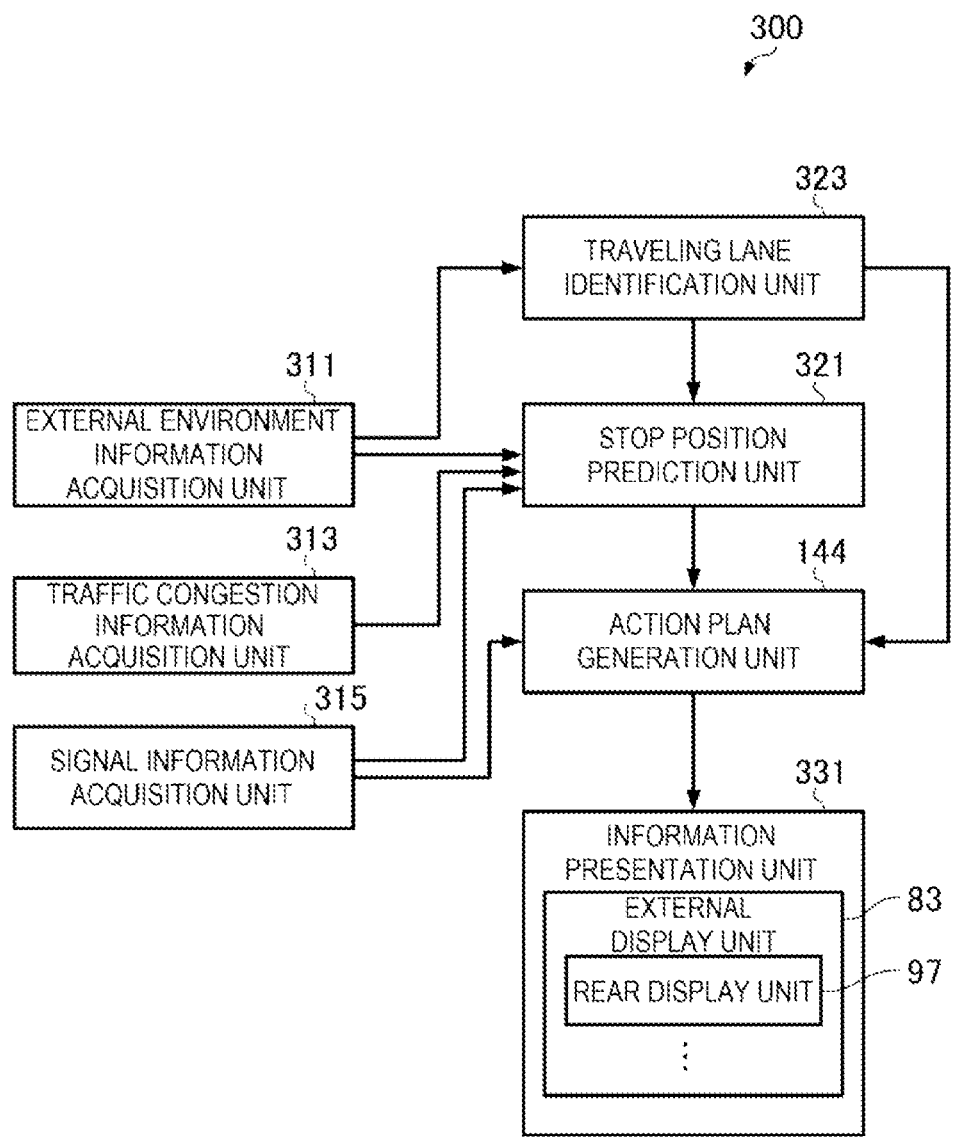
FIG. 6 is a block configuration diagram conceptually showing functions of the autonomous driving vehicle information presentation device.

FIG. 6 is a block configuration diagram conceptually showing functions of the autonomous driving vehicle information presentation device 300 according to the embodiment of the present invention.

As shown in FIG. 6, the autonomous driving vehicle information presentation device 300 includes an external environment information acquisition unit 311, a traffic congestion information acquisition unit 313, a signal information acquisition unit 315, a stop position prediction unit 321, a traveling lane identification unit 323, an action plan generation unit 144 (see FIG. 2), and an information presentation unit 331.

<External Environment information Acquisition Unit 311>

The external environment information acquisition unit 311 has a function of acquiring external environment information on a distribution condition (including a movement condition) of targets existing around the own vehicle M (in front of the own vehicle M in the traveling direction and behind the own vehicle M in the traveling direction) detected by the external environment sensor 10. Specifically, the external environment information acquisition unit 311 acquires external environment information including a traveling condition of a preceding vehicle existing ahead in the traveling direction of the own vehicle M and a traveling condition of a following vehicle existing behind in the traveling direction of the own vehicle M, which are detected by the external environment sensor 10.

An external environment information acquisition path of the external environment information acquisition unit 311 is not limited to the external environment sensor 10, and the navigation device 20 and the communication device 25 may also be adopted.

The external environment information acquisition unit 311 is a functional member corresponding to the recognition unit 140 of the vehicle control device 100 shown in FIG. 2.

<Traffic Congestion Information Acquisition Unit 313>

The traffic congestion information acquisition unit 313 has a function of acquiring information on traffic congestion ahead in the traveling direction of the own vehicle M. For example, the traffic congestion information acquisition unit 313 acquires information on traffic congestion ahead in the traveling direction of the own vehicle M based on traffic information provided by VICS via the communication device 25, traffic information provided by road-vehicle communication and vehicle-vehicle communication using the communication device 25, and the like.

The traffic congestion information acquisition unit 313 is a functional member corresponding to the recognition unit 140 of the vehicle control device 100 shown in FIG. 2.

<Signal Information Acquisition Unit 315>

The signal information acquisition unit 315 has a function of acquiring signal information on a traffic light existing ahead in the traveling direction of the own vehicle M (for example, a traffic light provided at an intersection ahead in the traveling direction of the own vehicle M). For example, the signal information acquisition unit 315 acquires signal information on a traffic light existing ahead in the traveling direction of the own vehicle M based on signal information provided by TSPS via the communication device 25, signal information provided by road-vehicle communication and vehicle-vehicle communication using the communication device 25, and the like.

The signal information acquisition unit 315 is a functional member corresponding to the recognition unit 140 of the vehicle control device 100 shown in FIG. 2.

<Stop Position Prediction Unit 321>

The stop position prediction unit 321 has a function of acquiring a traveling state including deceleration, slow traveling, and stop (start standby) of a preceding vehicle existing ahead in the traveling direction of the own vehicle M based on the external environment information acquired by the external environment information acquisition unit 311 and the traffic congestion information acquired by the traffic congestion information acquisition unit 313, and a function of predicting a stop position related to the preceding vehicle based on the acquired traveling state of the preceding vehicle.

Information indicating the stop position of the preceding vehicle predicted by the stop position prediction unit 321 is output to the action plan generation unit 144, and is provided for the action plan generation unit 144 to generate the action plan.

The stop position prediction unit 321 is a functional member corresponding to the recognition unit 140 of the vehicle control device 100 shown in FIG. 2.

<Traveling Lane Identification Unit 323>

The traveling lane identification unit 323 has a function of identifying a traveling lane where the own vehicle M travels, that is, a lane where the own vehicle M is currently located. For example, the traveling lane identification unit 323 recognizes and identifies the traveling lane of the own vehicle M based on the high-precision map information 181 stored in the storage unit 180 and information input from the camera 11, the radar 13, the LIDAR 15, the navigation device 20, or the vehicle sensor 30. The traveling lane identification unit 323 may also identify the traveling lane of the own vehicle M based on information obtained by road-vehicle communication, vehicle-vehicle communication using the communication device 25, or the like.

Information indicating the traveling lane of the own vehicle M identified by the traveling lane identification unit 323 is output to the action plan generation unit 144, and is provided for the action plan generation unit 144 to generate the action plan. For example, the action plan generation unit 144 extracts information corresponding to a lane identified by the traveling lane identification unit 323 (that is, a lane where the own vehicle M is currently located) from the signal information acquired by the signal information acquisition unit 315, and generates the action plan based on the extracted information.

Therefore, for example, even in a case where the own vehicle M travels on a road including a plurality of lanes on each side, such as a lane for straight traveling or turning left and a lane for turning right, the action plan generation unit 144 can generate the action plan based on appropriate signal information in consideration of the traveling lane of the own vehicle M. As a result, as will be described later below with reference to FIGS. 8A to 8E and the like, the autonomous driving vehicle information presentation device 300 can perform appropriate information presentation in consideration of the traveling lane of the own vehicle M to a driver of a following vehicle or the like based on the action plan appropriately generated in consideration of the traveling lane of the own vehicle M by a function of the information presentation unit 331 to be described later below The traveling lane identification unit 323 is a functional member corresponding to the recognition unit 140 of the vehicle control device 100 shown in FIG. 2.

<Information Presentation Unit 331>

The information presentation unit 331 has a function of using the external display device 83 to present information including the action plan of the own vehicle M generated by the action plan generation unit 144. Specifically, for example, as will be described later below with reference to FIG. 8A and the like, the information presentation unit 331 presents information with the driver of the following vehicle serving as a presentation target through using a rear display unit 97 of the external display device 83, the rear display unit 97 being provided at a position in the rear portion of the vehicle interior of the own vehicle M which is visually recognizable (for example, easily visually recognizable) by the driver of the following vehicle.

The information presentation unit 331 is a functional member corresponding to the HMI control unit 170 of the vehicle control device 100 shown in FIG. 2.

[Operation of Autonomous driving Vehicle Information Presentation Device 300]

Next, an operation of the autonomous driving vehicle information presentation device 300 according to the embodiment of the present invention will be described with reference to FIG. 7.

Figure 7:
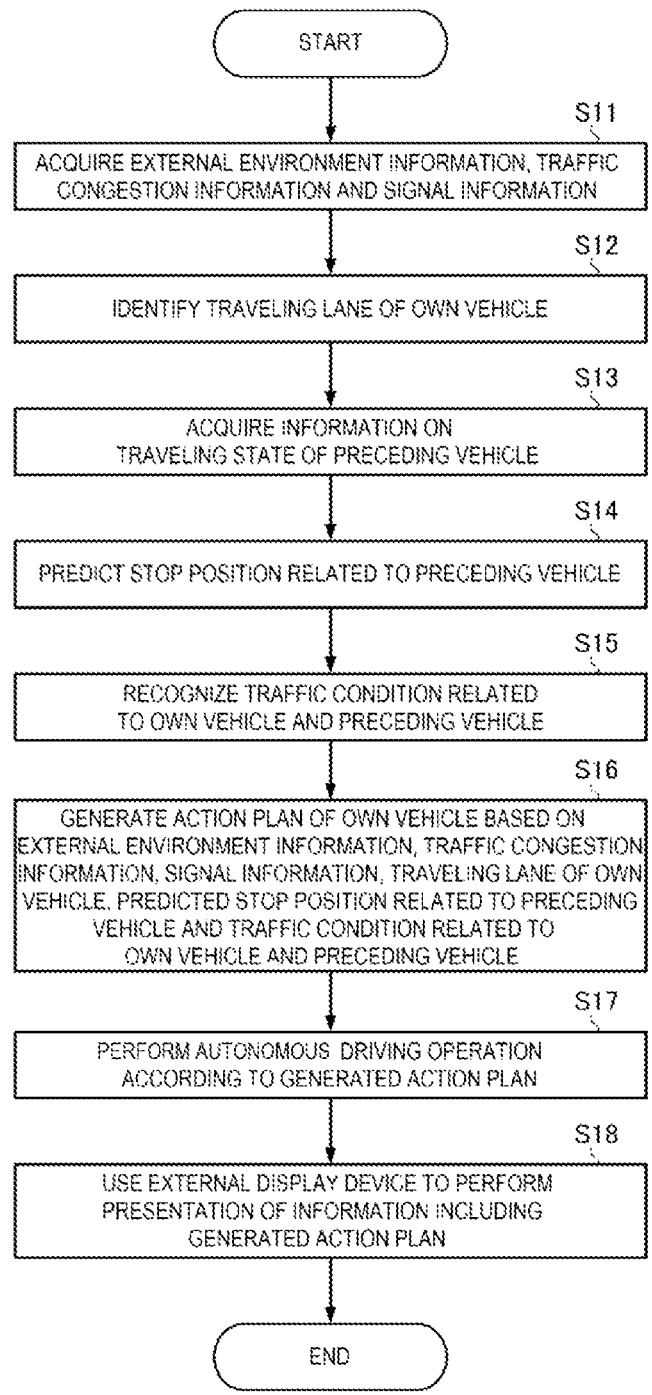
FIG. 7 is a flowchart showing an operation of the autonomous driving vehicle information presentation device.

FIG. 7 is a flowchart showing the operation of the autonomous driving vehicle information presentation device 300.

In the following description of FIG. 7, as a premise, it is assumed that the autonomous driving vehicle M where the autonomous driving vehicle information presentation device 300 is mounted travels in a preset autonomous driving mode.

In step S11 shown in FIG. 7, the external environment information acquisition unit 311 acquires the external environment information including the traveling condition of the preceding vehicle existing ahead in the traveling direction of the own vehicle M and the traveling condition of the following vehicle existing behind in the traveling direction of the own vehicle M, which are detected by the external environment sensor 10. The traffic congestion information acquisition unit 313 acquires the information on traffic congestion ahead in the traveling direction of the own vehicle M. Then, the signal information acquisition unit 315 acquires the signal information on the traffic light existing ahead in the traveling direction of the ow vehicle M.

In steps S12 to S14, the recognition unit 140 (see FIG. 2) including the action plan generation unit 144, the stop position prediction unit 321, the traveling lane identification unit 323, and the like identifies the traveling lane of the own vehicle M based on the various types of information acquired in step S11 and information (for example, the high-precision map information 181) stored in advance in the storage unit 180, acquires the traveling state including deceleration, slow traveling, and stop (start standby) of the preceding vehicle existing ahead in the traveling direction of the own vehicle M, and predicts the stop position (predicted stop position) related to the preceding vehicle based on the acquired traveling state of the preceding vehicle.

In step S15, the recognition unit 140 recognizes a traffic condition related to the own vehicle M and the preceding vehicle based on the various types of information acquired in step S11 and the like.

in step S16, the recognition unit 140 generates the action plan of the own vehicle M based on the external environment information, the traffic congestion information, and the signal information acquired in step S11, the traveling lane of the own vehicle M identified in step S12, the predicted stop position related to the preceding vehicle acquired in step S14, and the traffic condition related to the own vehicle M and the preceding vehicle recognized in step S15.

In step S17, the travel control unit 160 (see FIG. 2) performs an autonomous driving operation according to the action plan of the own vehicle M generated in step S16.

In step S18, the information presentation unit 331 uses the external display device 83 to perform presentation of information including the action plan of the own vehicle M generated in step S16. For example, the information presentation unit 331 performs the information presentation with the driver of the following vehicle serving as the presentation target through using the rear display unit 97.

[Specific Example of Information Presentation Performed by Autonomous Driving Vehicle Information Presentation Device]

Next, a specific example of information presentation performed by the autonomous driving vehicle information presentation device 300 according to the embodiment of the present invention will be described with reference to FIGS. 8A to 8E.

A road RD1 shown in FIGS. 8A to 8E is a road with two lanes on each side including a lane LN1 and a lane LN2 in which a vehicle can travel in a direction from left to right, and a lane LN3 and a lane LN4 in which the vehicle can travel in a direction from right to left in FIGS. 8A to 8E. The road RD1 intersects a road RD2 which is another road at an intersection IS.

Hereinafter, for convenience of description, a portion of the lane LN1 on the left side of the intersection IS in FIGS. 8A to 8E (that is, on a front side of a vehicle traveling in the lane LN1) is also referred to as a "lane LN1a". Here, the lane LN1a is a lane that allows traveling straight ahead and turning left at the intersection IS, and, meanwhile, prohibits turning right at the intersection IS due to traffic regulations.

Hereinafter, for convenience of description, a portion of the lane LN2 on the left side of the intersection IS in FIGS. 8A to 8E (that is, on a front side of a vehicle traveling in the lane LN2) is also referred to as a "lane LN2a". Here, the lane LN2a is a lane that allows traveling straight ahead and turning right at the intersection IS, and, meanwhile, prohibits turning left at the intersection IS due to traffic regulations.

At the intersection IS, a traffic light SG is provided as a traffic light for the vehicles traveling in the lane LN1a and the lane LN2a. The traffic light SG is an arrow-type traffic light including an arrow lighting unit SG_A in addition to three colored lighting units including a green lighting unit SG_G, a yellow lighting unit SG_Y, and a red lighting unit SG_R.

The arrow lighting unit SG_A emits a green arrow for permitting the vehicle in the lane LN2a to travel for turning right at the intersection IS (hereinafter, also referred to as a "right turn arrow"). For example, the traffic light SG causes the arrow lighting unit SG_A to emit the right turn arrow for a predetermined period immediately after lighting of the red lighting unit SG_R.

Figure 8A:
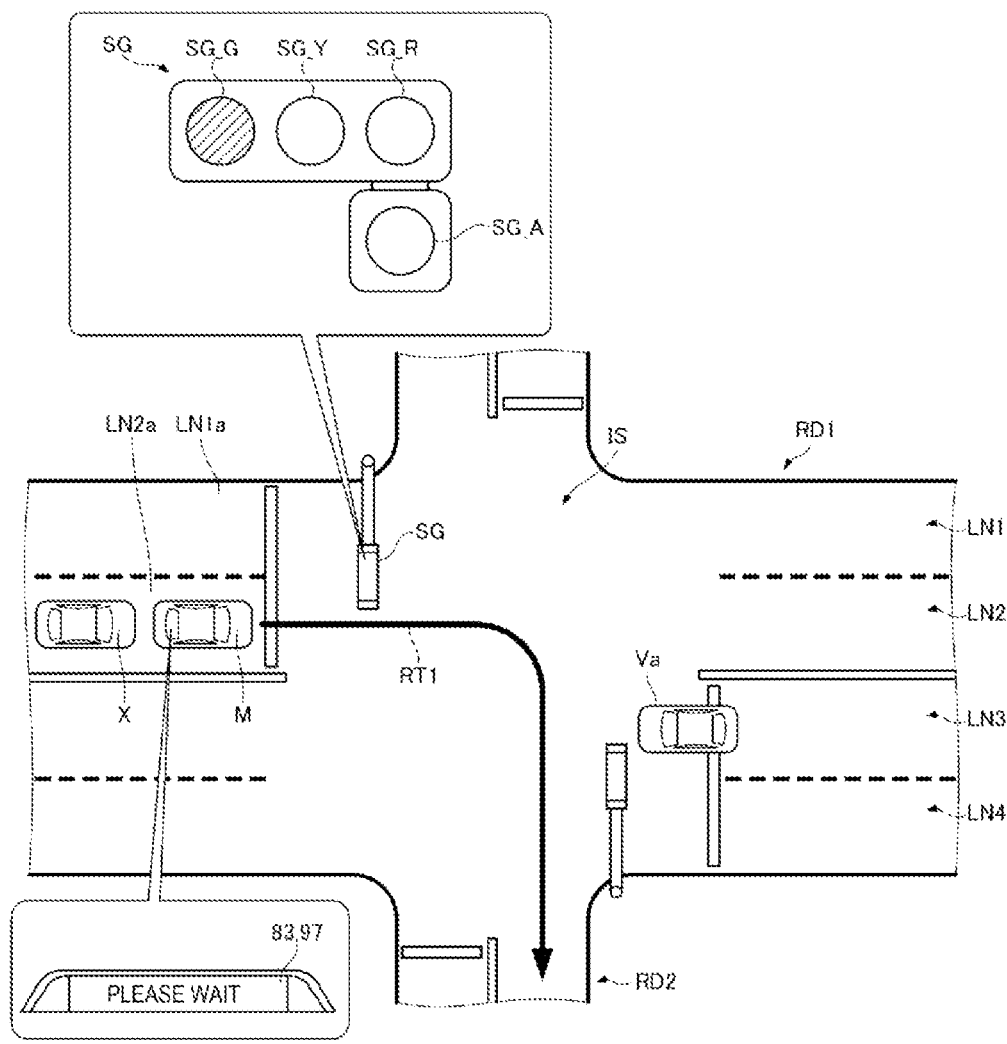
FIG. 8A shows a specific information presentation example of the autonomous driving vehicle information presentation device (part 1).

In the example shown in FIG. 8A, the autonomous driving vehicle M where the autonomous driving vehicle information presentation device 300 is mounted is located in the lane LN2a, and a scheduled route RT1 (that is, the traveling direction of the own vehicle M) along which the own vehicle M travels turns right at the intersection IS and heads toward the road RD2. In such a traveling scene, for example, as shown in FIG. 8A, since there is an oncoming vehicle Va traveling in the lane LN3 or the lane LN4 and entering the intersection IS, even if the green lighting unit SG_G is lighted, the autonomous driving vehicle M (the vehicle control device 100) may determine that traveling at the intersection IS (that is, turning right) is not allowed at the present time and stop the own vehicle M.

In such a case, as shown in FIG. 8A, the autonomous driving vehicle information presentation device 300 displays, for example, a message "please wait" on the rear display unit 97. As a result, the autonomous driving vehicle information presentation device 300 can notify a driver of a following vehicle X of the own vehicle M that the own vehicle M cannot travel despite the green lighting unit SG_G is lighted.

Instead of or in addition to the above message, the autonomous driving vehicle information presentation device 300 may cause the rear display unit 97 to display a countdown of a remaining time of the lighting of the right turn arrow on the arrow lighting unit SG_A based on information corresponding to the lane LN2a among the acquired signal information related to the traffic light SG. In this way, it is possible to notify the driver of the following vehicle X of the own vehicle M of an approximate remaining time until the own vehicle M travels.

Figure 8B:
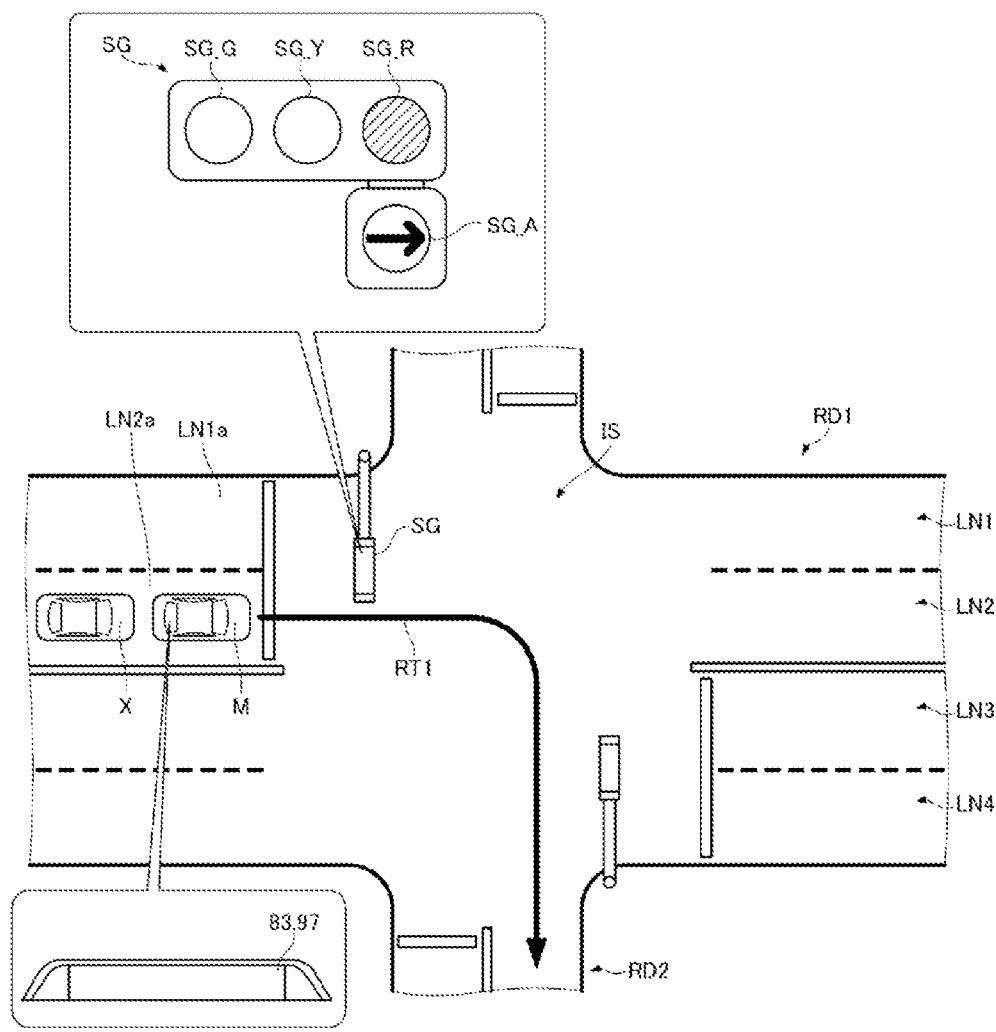
FIG. 8B shows the specific information presentation example of the autonomous driving vehicle information presentation device (part 2).

Thereafter, as shown in FIG. 8B, for example, when the red lighting unit SG_R is lighted while the right turn arrow is lighted on the arrow lighting unit SG_A, and the own vehicle M enters a state where the own vehicle M can travel (that is, turn right) at the intersection IS, the autonomous driving vehicle information presentation device 300 hides the message of "please wait" that has been displayed on the rear display unit 97. As a result, the autonomous driving vehicle information presentation device 300 can notify the driver of the following vehicle X that the own vehicle M can travel (the own vehicle M will travel soon). At this time, the autonomous driving vehicle information presentation device 300 may also cause the rear display unit 97 to display, for example, a message "travel soon".

Figure 8C:
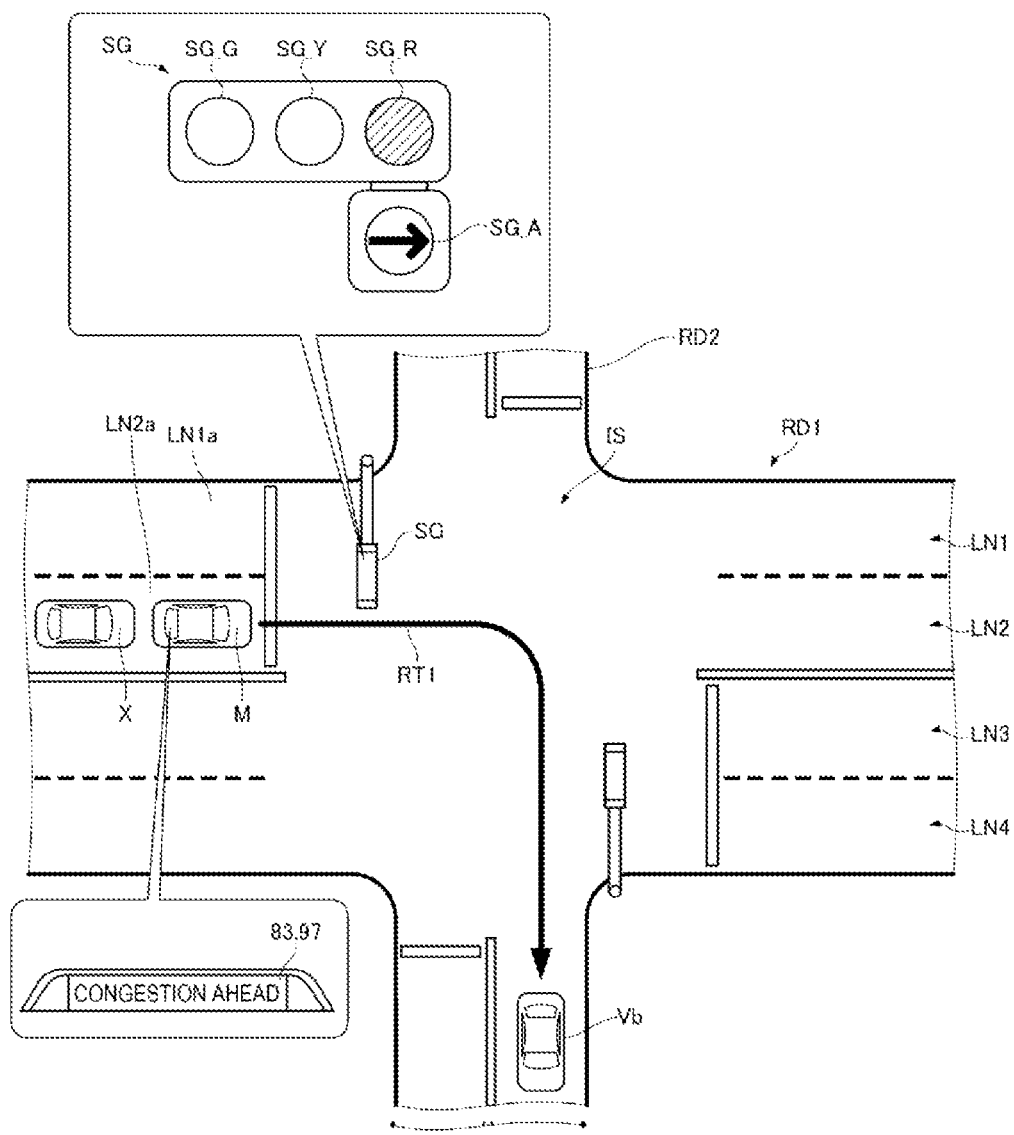
FIG. 8C shows the specific information presentation example of the autonomous driving vehicle information presentation device (part 3).

As shown in FIG. 8C, it is also conceivable that the road RD2 is congested and the own vehicle M cannot travel (that is, turn right) at the intersection IS even if the right turn arrow is lighted on the arrow lighting unit SG_A. In the example shown in FIG. 8C, since there is another vehicle Vb on the road RD2 ahead in the traveling direction of the own vehicle M, there is no empty space where the own vehicle M can enter at the present time on the road RD2, the autonomous driving vehicle M determines that traveling (that is, turning right) at the intersection IS is not allowed, and stops the own vehicle M.

In such a case, as shown in FIG. 8C, the autonomous driving vehicle information presentation device 300 displays, for example, a message "congestion ahead" on the rear display unit 97. As a result, the autonomous driving vehicle information presentation device 300 can notify the driver of the following vehicle X that the road RD2 is congested and thus the own vehicle M cannot travel despite the right turn arrow is lighted on the arrow lighting unit SG_A.

Figure 8D:
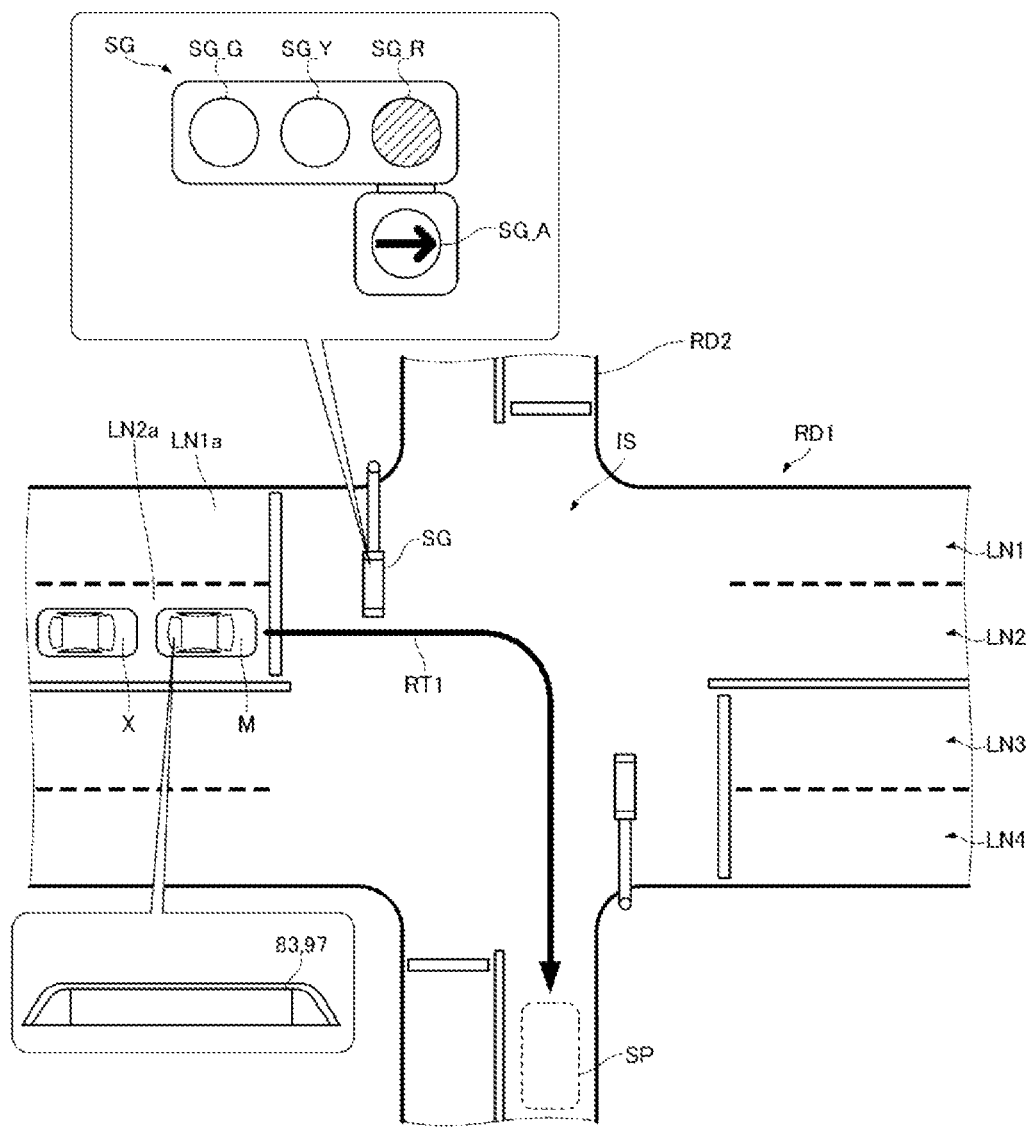
FIG. 8D shows the specific information presentation example of the autonomous driving vehicle information presentation device (part 4).

Thereafter, as shown in FIG. 8D, for example, when the autonomous driving vehicle M determines that an empty space (refer to a dotted line indicated by a reference sign SP in FIG. 8D) where the own vehicle M can enter is formed on the road RD2 due to forward movement of the vehicle Yb and the own vehicle M is in a state where the own vehicle M can travel (that is, turn right) at the intersection IS, the autonomous driving vehicle information presentation device 300 hides the message "congestion ahead" that has been displayed on the rear display unit 97. As a result, the autonomous driving vehicle information presentation device 300 can notify the driver of the following vehicle X that the ow vehicle M can travel (the own vehicle M will travel soon). At this time, the autonomous driving vehicle information presentation device 300 may also cause the rear display unit 97 to display, for example, a message "travel soon".

Figure 8E:
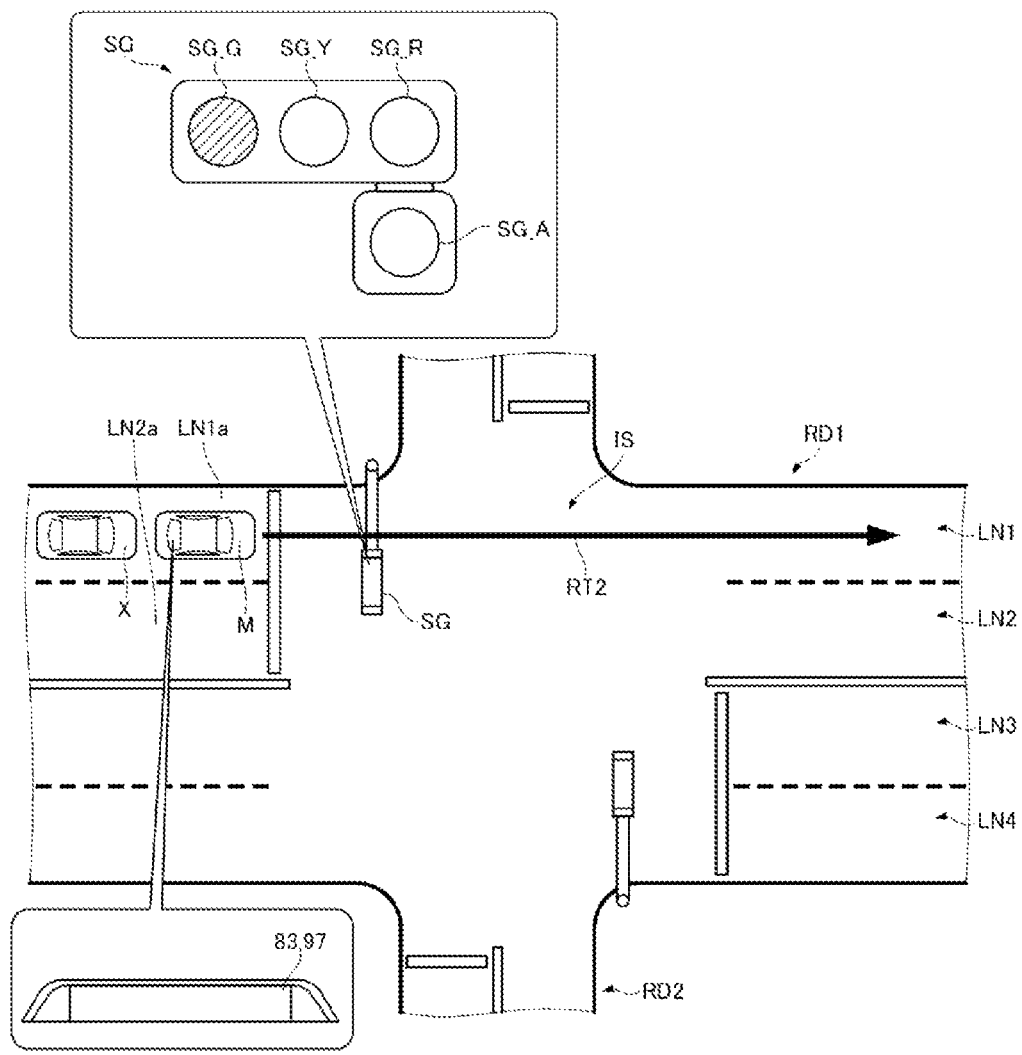
FIG. 8E shows the specific information presentation example of the autonomous driving vehicle information presentation device (part 5).

For example, as shown in FIG. 8E, it is assumed that the autonomous driving vehicle M is located in the lane LN1a, and a scheduled route RT2 along which the own vehicle M travels (that is, the traveling direction of the own vehicle M) extends straight through the intersection IS. In such a case, unlike the example shown in FIG. 8A, when the green light unit SG_G is lighted, the own vehicle M enters a state where the own vehicle M can travel at the intersection IS, and thus, as shown in FIG. 8E, for example, the autonomous driving vehicle information presentation device 300 does not display the above-described message "please wait" on the rear display unit 97, As described above, according to the autonomous driving vehicle information presentation device 300, the external environment information including the preceding vehicle existing ahead in the traveling direction of the own vehicle M and the information on traffic congestion ahead in the traveling direction of the ow vehicle M are acquired, the traveling state including deceleration, slow traveling, and stop of the preceding vehicle is acquired based on the acquired external environment information and congestion information, and the stop position related to the preceding vehicle is predicted based on the acquired traveling state of the preceding vehicle. Further, the autonomous driving vehicle information presentation device 300 identifies the lane where the own vehicle M is currently located, and generates the action plan of the own vehicle M based on the predicted stop position related to the preceding vehicle and the identified lane where the own vehicle M is currently located. Then, the autonomous driving vehicle information presentation device 300 uses the external display device 83 such as the rear display unit 97 to present information including the generated action plan. As a result, the autonomous driving vehicle information presentation device 300 can perform appropriate information presentation in consideration of the traveling lane of the own vehicle M to the driver of the following vehicle based on the action plan appropriately generated in consideration of the lane where the own vehicle M is currently located.

The present invention is not limited to the embodiment described above, and modifications, improvements, or the like can be made as appropriate.

For example, although the vehicle that travels in the traveling lane common to the own vehicle M immediately in front of the own vehicle M and is the follow-up target during the follow-up travel control is referred to as the "preceding vehicle" among the surrounding vehicles in the embodiment described above, the present invention is not limited thereto. For example, among the surrounding vehicles, all vehicles traveling ahead in the traveling direction of the own vehicle M may be referred to as "preceding vehicles". That is, the "preceding vehicle" in this case includes a vehicle (for example, the vehicle Vb shown in FIG. 8C) traveling in a traveling lane different from that of the own vehicle M (however, a traveling direction thereof is the same as that of the own vehicle M) in addition to the vehicle traveling in the traveling lane common to the own vehicle M.

Although the vehicle that travels in the traveling lane common to the own vehicle M and immediately behind the own vehicle M is referred to as the "following vehicle" among the surrounding vehicles, the present invention is not limited thereto. For example, among the surrounding vehicles, all vehicles traveling behind in the traveling direction of the own vehicle M may be referred to as "following vehicles". That is, the "following vehicle" in this case includes a vehicle traveling in a traveling lane different from that of the own vehicle M (however, a traveling direction thereof is the same as that of the own vehicle M) in addition to the vehicle traveling in the traveling lane common to the own vehicle M.

The present invention can also be implemented in a form in which a program for implementing one or more functions according to the above-described embodiment is supplied to a system or a device via a network or a storage medium, and one or more processors in a computer of the system or the device read and execute the program. The present invention may be implemented by a hardware circuit (for example, an ASIC) that implements one or more functions. Information including a program for implementing each function can be held in a recording device such as a memory or a hard disk, or a recording medium such as a memory card or an optical disk.

At least the following matters are described in the present specification.

Components corresponding to those according to the embodiment described above are shown in parentheses. However, the present invention is not limited thereto.

(1) An autonomous driving vehicle information presentation device (autonomous driving vehicle information presentation device 300) used for an autonomous driving vehicle (autonomous driving vehicle M) that acquires external environment information including a preceding vehicle existing ahead in a traveling direction of an own vehicle and automatically performs at least one of speed control and steering control of the own vehicle based on the acquired external environment information, the autonomous driving vehicle information presentation device being configured to present information to a traffic participant existing around the own vehicle, the autonomous driving vehicle information presentation device includes:

a traffic congestion information acquisition unit (traffic congestion information acquisition unit 313) configured to acquire information on traffic congestion ahead in the traveling direction of the own vehicle;

a traveling lane identification unit (traveling lane identification unit 323) configured to identify a lane Where the own vehicle is currently located;

a stop position prediction unit (stop position prediction unit 321) configured to acquire a traveling state including deceleration, slow traveling, and stop of the preceding vehicle based on the external environment information and the traffic congestion information, and to predict a stop position related to the preceding vehicle based on the acquired traveling state of the preceding vehicle;

an action plan generation unit (action plan generation unit 144) configured to generate an action plan of the own vehicle based on the stop position related to the preceding vehicle and the currently located lane; and an information presentation unit (information presentation unit 331) configured to present information including the generated action plan through using an external display device (rear display unit 97) provided at a rear portion of a vehicle interior of the own vehicle at a position visible to an occupant of a following vehicle.

According to (1), appropriate information presentation can be performed in consideration of the traveling lane of the own vehicle to the driver of the following vehicle based on the action plan appropriately generated in consideration of the lane where the own vehicle is currently located.

(2) The autonomous driving vehicle information presentation device according to (1) further includes a signal information acquisition unit (signal information acquisition unit 315) configured to acquire signal information on a traffic light existing ahead in the traveling direction of the own vehicle, and the action plan generation unit generates the action plan further based on information corresponding to the currently located lane among the signal information.

According to (2), since the action plan can be generated based on the signal information in consideration of the lane where the own vehicle is currently located, the appropriate information presentation can be performed in consideration of the traveling lane of the own vehicle to the driver of the following vehicle based on the action plan appropriately generated in consideration of the lane where the own vehicle is currently located.

What is claimed is:

1. An autonomous driving vehicle information presentation device used for an autonomous driving vehicle that acquires external environment information including a preceding vehicle existing ahead in a traveling direction of an own vehicle and automatically performs at least one of speed control and steering control of the own vehicle based on the acquired external environment information, the autonomous driving vehicle information presentation device being configured to present information to a traffic participant existing around the own vehicle, the autonomous driving vehicle information presentation device comprising:

a traffic congestion information acquisition unit configured to acquire information on traffic congestion ahead in the traveling direction of the own vehicle;

a traveling lane identification unit configured to identify a lane where the own vehicle is currently located;

a travelling state acquiring unit configured to acquire a traveling state including deceleration, slow traveling, and stop of the preceding vehicle based on the external environment information and the traffic congestion information;

an action plan generation unit configured to generate an action plan of the own vehicle based on the travelling state of the preceding vehicle, which travels a lane in which the own vehicle is to turn right or left, as acquired by the traveling state acquiring unit in a case where the own vehicle is scheduled to turn right or left at an intersection from the currently located lane; and an information presentation unit configured to present information including the generated action plan through using an external display device provided at a rear portion of a vehicle interior of the own vehicle at a position visible to an occupant of a following vehicle, wherein the traffic congestion information acquisition unit, the traveling lane identification unit, the action plan generation unit, and the information presentation unit are each implemented via at least one processor.

2. The autonomous driving vehicle information presentation device according to claim 1 further comprising:

a signal information acquisition unit configured to acquire signal information on a traffic light existing ahead in the traveling direction of the own vehicle, wherein the action plan generation unit is further configured to generate the action plan further based on information corresponding to the currently located lane among the signal information, and the signal information acquisition unit is implemented via at least one processor.

* * * * *